(12) United States Patent
Leichsenring et al.

(10) Patent No.: US 8,122,263 B2
(45) Date of Patent: Feb. 21, 2012

(54) APPLICATION EXECUTING DEVICE, MANAGING METHOD, AND PROGRAM

(75) Inventors: Germano Leichsenring, Osaka (JP); Tomokazu Kanamaru, Osaka (JP)

(73) Assignee: Panasonic Corporation, Osaka (JP)

( * ) Notice: Subject to any disclaimer, the term of this patent is extended or adjusted under 35 U.S.C. 154(b) by 884 days.

(21) Appl. No.: 11/573,477

(22) PCT Filed: Feb. 13, 2006

(86) PCT No.: PCT/JP2006/302448
§ 371 (c)(1), (2), (4) Date: Feb. 9, 2007

(87) PCT Pub. No.: WO2006/085647
PCT Pub. Date: Aug. 17, 2006

(65) Prior Publication Data
US 2009/0222674 A1    Sep. 3, 2009

(30) Foreign Application Priority Data

Feb. 14, 2005    (JP) .................................. 2005-036621

(51) Int. Cl.
G06F 11/30    (2006.01)
(52) U.S. Cl. ......................................... 713/194; 713/193
(58) Field of Classification Search .......... 713/156–159, 713/193–194
See application file for complete search history.

(56) References Cited

U.S. PATENT DOCUMENTS

| | | | |
|---|---|---|---|
| 5,825,877 A | 10/1998 | Dan et al. | |
| 6,097,811 A * | 8/2000 | Micali | 713/186 |
| 6,327,652 B1 | 12/2001 | England et al. | |
| 6,385,596 B1 * | 5/2002 | Wiser et al. | 705/51 |
| 6,553,494 B1 * | 4/2003 | Glass | 713/186 |
| 6,584,495 B1 | 6/2003 | Bisset et al. | |
| 2002/0114466 A1 * | 8/2002 | Tanaka et al. | 380/232 |
| 2002/0184505 A1 * | 12/2002 | Mihcak et al. | 713/180 |
| 2004/0054920 A1 * | 3/2004 | Wilson et al. | 713/200 |
| 2005/0005099 A1 | 1/2005 | Naruse et al. | |
| 2005/0138397 A1 | 6/2005 | Kusudo et al. | |
| 2005/0138401 A1 | 6/2005 | Terao et al. | |
| 2005/0234825 A1 | 10/2005 | Andersson | |
| 2006/0015746 A1 | 1/2006 | Kusudo et al. | |
| 2006/0269222 A1 | 11/2006 | Horii | |

(Continued)

FOREIGN PATENT DOCUMENTS

EP    1 361 527    11/2003

(Continued)

OTHER PUBLICATIONS

English language abstract of JP 10-83310.

(Continued)

*Primary Examiner* — Edan Orgad
*Assistant Examiner* — Brian Olion
(74) *Attorney, Agent, or Firm* — Greenblum & Bernstein, P.L.C.

(57) ABSTRACT

A BD-ROM stores a disc root certificate 301 that is issued by a root certificate authority and assigned to the disc medium. An application manger 2 acquires a hash value from the disc root certificate 301 and verifies the authenticity of an application by using the hash value. If the authenticity is verified, the virtual machine 3 executes the application. A local storage 5 has a plurality of domain areas. Form among the plurality of domain areas, a security manger 4 allocates to the application a domain area that corresponds to the hash value.

4 Claims, 17 Drawing Sheets

U.S. PATENT DOCUMENTS

2007/0033651 A1    2/2007    Imanishi
2007/0234422 A1    10/2007    Piesing

FOREIGN PATENT DOCUMENTS

| | | |
|---|---|---|
| JP | 10-083310 | 3/1998 |
| JP | 10-83310 | 3/1998 |
| JP | 2004-302973 | 10/2004 |
| JP | 2005-524910 | 8/2005 |
| WO | 03/096238 | 11/2003 |
| WO | 03234825 | 11/2003 |
| WO | WO2005036404 * | 4/2005 |

OTHER PUBLICATIONS

Oaks, "Java Security," O'Reilly-Japan, May, 2000, pp. 69-133.
U.S. Appl. No. 11/568,862 to Tanaka et al., which was filed on Nov. 9, 2006.
U.S. Appl. No. 11/571,098 to Kanamaru et al., which was filed on Dec. 21, 2006.
English language abstract of JP 2004-302973.
Flanagan, "Java Quick Reference," 3rd edition, O'Reilly-Japan, Dec. 20, 2000, pp. 230-242, and related English language edition, Flanagan, "Java in a Nutshell, A Desktop Quick Reference," $3^{rd}$ edition, O'Reilly, Nov. 1999, pp. 168-177.
ETSI "ETSI TS 101 812 V1.2.1", European Broadcasting Union, Jun. 2002.
Official Action in related U.S. Appl. No. 12/608,643, dated Jun. 6, 2011.
Japanese Office Action issued in the corresponding Japanese Patent Application No. 2009-182440 by the Japan Patent Office (JPO) on Jun. 21, 2011.
Extended European Search Report from E.P.O., dated Mar. 29, 2011.

* cited by examiner

FIG.2A

Credential in bd.XXXX.perm
(Permission Request File)

| | |
|---|---|
| 501 | Provider Root Certificate Hash |
| 502 | Provider ID |
| 503 | Recipient Root Certificate Hash |
| 504 | Recipient ID |
| 505 | Recipient Application ID |
| 506 | Provided File List |

| | |
|---|---|
| 507 | Provided File Name |
| 508 | Access Type |

FIG.2B

Credential

| | |
|---|---|
| 501 | 96:9E:10:F7:38:53:51:E1:BD:E8:A8:D1:BA:60:10:94 |
| 502 | "4" |
| 503 | 42:6C:40:25:2C:4B:04:9D:20:E7:45:97:02:D2:01:08 |
| 504 | "7" |
| 505 | "8" |
| 507 | "4/5/scores.txt" |
| 508 | "read" |
| 507 | "4/5/etc/settings.txt" |
| 508 | "read", "write" |

506 encompasses rows 507–508.

FIG.9

Management Information held by Application Manager
Permission Request File (bd.XXX.perm)

| Disc Root Certificate | (X.509 Format File) | |
|---|---|---|

302

| Jar File Name | "0001.jar" | "0002.jar" |
|---|---|---|
| Organization ID | "7" | None |
| Application ID | "8" | "35" |
| Interprocess Communication | "enable" | "disable" |
| Credential | Credential list | None |

Credential list

FIG.10

| Provider Root Certificate Hash | 96:9E:10:F7:38:53:51:E1:BD:E8:A8:D1:BA:60:10:94 | 501 |
|---|---|---|
| Provider ID | "4" | 502 |
| Provided File List | | 506 |

| Provided File Name | "4/5/scores.txt" | "4/5/etc/settings.txt" | 507 |
|---|---|---|---|
| Access Type | "read" | "resad", "write" | 508 |

FIG.13

Hash Management Table Held by Security Manager

| Provider Root Certificate Hash | 96:9E:10:F7:38:53:51:E1<br>:BD:E8:A8:D1:BA:60:10:94 | 42:6C:40:25:2C:4B:04:9D<br>:20:E7:45:97:02:D2:01:08 | ← 1301 |
|---|---|---|---|
| Local Storage Root | /persistent/0001 | /persistent/0003 | ← 1302 |

APPLICATION EXECUTING DEVICE, MANAGING METHOD, AND PROGRAM

TECHNICAL FIELD

The present invention relates to the field of resource allocation to applications.

BACKGROUND ART

Resource allocation techniques are inventions relating to the technical field of allocating areas of a storage device (local storage) of a platform to applications. In order to systematically manage various applications provided by various organizations around the world, MHP (Multimedia Home Platform), which is implemented in digital broadcast receivers designed for use in Europe, defines the structure of local storage directories, so that the local storage is accessible via a file path of a unified format shown below.

File Path Root/Organization ID/Application ID

The organization ID in the file path is an identifier uniquely identifying an organization that is the supplier of the application. The application ID is an identifier uniquely identifying the application.

In order to carry out the storage area allocation, an MHP-complaint device verifies the authenticity of the application using a root certificate. The following describes authenticity verification of the application and storage allocation to the application.

Generally, a creator of an application attaches a root certificate to the application before providing the application to a device. The root certificate is identical to a root certificate uniquely assigned to the device. On receiving an application attached with a root certificate, the device judges whether the attached root certificate is identical to the root certificate assigned to the device. If the two root certificates are identical, the device allocates, to the application, an organization directory corresponding to the supplier organization of the application. Thus, the application is allowed to access any file contained in the organization directory.

A technique for appropriately controlling application's access right is disclosed in the following non-patent document 1.

[Non-Patent Document 1]
"JAVA™ Security" Written by Scott Oaks Published by O'Reilly (May 2001, ISBN 0-596-00157-6)

DISCLOSURE OF THE INVENTION

Problems the Invention is Attempting to Solve

According to the state-of-the-art technique mentioned above, separate directories are created and assigned to respective application supplier organizations. On receiving an access request from an application, the device allocates to the application an area within a directory assigned to a supplier organization of the application. For this reason, it is required to ensure that organization IDs of various organizations around the world are all unique without redundancy. This is especially true in the case where application executing devices are used at various locations around the world and thus receive applications from various organizations around the world. Otherwise, there is a risk that an application supplied from one organization is allowed to freely access a directory allocated to another organization. As a result, the confidentiality of data used by applications cannot be maintained. In order to ensure that organization IDs are all unique, a third-party body needs to be established to assign an organization ID unique to each one of application supplier organizations. Establishment and operation of such a third-party body requires capital investment and human resources borne by makers included in standardization of application executing devices. This places a significant burden on the makers. Yet, on the other hand, if a directory allocated to one organization is allowed to be freely accessible by another organization, there is a risk that data for use by an application of one organization is stolen or used by another organization without proper authorization. If no measure is taken against this undesirable situation, it is anticipated that application creators become reluctant to supply their applications to devices. This could be a hindrance to increase the number of applications that are executable on application executing devices. If little applications are executable, application executing devices may not gain popularity.

In addition, an MHP device judges the authenticity of an application using the root certificate assigned to that device. Thus, if a malicious party exposes the root certificate assigned to the device, the device maker renews the exposed certificate. Once the root certificate is renewed, applications attached with the old version certificate can no longer be authenticated properly and thus not permitted to access the local storage. In the case of applications used by an MHP device, renewal of certificate will cause no problem. It is because such applications are basically for one-time use at the time of broadcasting and thus transmitted one after another in succession. However, in the case of applications for executing processing in relation to a movie recorded on a disc, such as DVD-Video content and BD-ROM content, it is required that such an application runs properly each time an old movie is played over and over. For this reason, it should be avoided that an application becomes non-executable as a result of root certificate renewal. That is to say, the state-of-the-art technique fails to reliably ensure that an application is executable even if the case where the root certificate of the application is exposed.

The first object of the present invention is to provide an application executing device capable of ensuring the confidentiality of files for use by various applications supplied from various organizations, without the need to manage organization IDs to avoid redundancy.

The second object of the present invention is to provide an application executing device capable of reliably ensuring proper execution of an application even in the case where the root certificate of the application is exposed.

Means for Solving the Problems

In order to achieve the above first and second objects, the present invention provides an application executing device for reading and executing an application from a disc medium. The disc medium has recorded thereon the application and a disc root certificate issued by a root certificate authority and assigned to the disc medium. The application executing device includes: a management unit operable to acquire a hash value from the disc root certificate and verify authenticity of the application by using the hash value; an execution unit operable to execute the application if the authenticity is verified by the management unit; a storage unit having a plurality of domain areas; and an allocation unit operable to allocate, to the application, one of the domain areas that corresponds to the acquired hash value.

Effects of the Invention

Owing to the technical features (1) described above, the local storage of the application executing device according to the present invention has a plurality of domain areas assigned to hash values of different root certificates. Areas for each organization and each application are created within a corresponding one of the domain areas. As a result, it is no longer necessary that the organization IDs are all unique on a worldwide scale. Rather, it is sufficient that the organizations are distinguished from one another within a finite "domain area". Consequently, it is no longer necessary that the values of organization IDs assigned to different organizations are all unique. Thus, ID management by a third-party body is no longer required. Without the need to ensure that each organization ID is unique, it is achieved that various applications supplied from various organizations around the world are executable on one platform, while improving the confidentially of files to be read/written by respective applications.

As described above, without the ID management by a third-party body, the cause is eliminated that would likely to keep application creators from supplying their applications. In addition, the independence and integrity of files used by applications are improved. This helps to encourage various organizations including movie makers, movie distributors, broadcasting stations, publishers, and software houses around the world, to supply their applications. As a result, a rich lode of applications becomes available, so that more and more applications are executable on the application executing devices. This gives great momentum to the wide-spread use of application executing devices embodied as disc medium players.

It should be noted that the root certificate is assigned not to the main body of an application executing device but to a domain area of the storage unit. An application supplied via a disc medium is executable on the application executing device, as long as the application is associated with the disc root certificate of the disc medium and the disc medium is loaded to the application executing device. It is true that there still is a risk that the disc root certificate is exposed. Yet, what needs to be done in such a case is to disable the specific disc medium for further use or to renew the specific disc root certificate. Applications supplied via other discs remain executable using their disc root certificate. Thus, it is reliably ensured that applications are executable.

As described above, the present invention eliminates the need for organization ID management on a worldwide basis. In addition, the present invention reliably ensures that existing applications are executable. Thus, the present invention significantly contributes to the world-level standardization of application executing devices for executing movie-related applications.

Optionally, the technical features (2) and (3) below may be added to the technical features (1) described above. With the addition, the application executing device is defined to having a more detailed-structure and will achieve further effects. The present application defines those additional technical features in a plurality of claims dependent from claim 1.

Technical Features (2): the disc medium has recorded thereon a first digital certificate chain; the authenticity verification by the management unit includes a judgment as to whether the hash value acquired from the disc root certificate matches a hash value acquired from a root certificate of the first digital certificate chain; the domain area includes a plurality of organization areas; and the allocation by the allocation unit includes permitting, if the two hash values match, the application to use one of the organization areas that is in the domain area allocated to the application and that corresponds to an organization ID indicated in a leaf certificate of the first digital chain.

With the additional technical features described above, it is ensured on a business model employing an existing certificate authority, that a first application is prohibited from incorrectly using resources allocated to a second application. The protection against incorrect use of resources is achieved through shared use of the same disc certificate by a plurality of organizations, rather than through storing a root certificate within the application executing device. Consequently, compatibility is ensured before and after renewal of the certificate held in the application executing device.

Technical Features (3): an organization by which the application is supplied has authorization received from another organization to use an organization area that is allocated to said another organization; the disc media further having recorded thereon credential information that indicates a provider ID and a recipient ID respectively identifying a provider organization and a recipient organization of authorization to use an organization area allocated to the provider organization; the management unit is further operable to verify authenticity of the credential information; and the allocation by the allocation unit includes permitting, if the authenticity of the credential information is verified, the application to use one of the organization areas that is in the domain area allocated to the application and that corresponds to the provider ID.

Technical Features (4): the credential information includes a hash value acquired from a root certificate unique to the provider organization and a hash value acquired from a root certificate unique to the recipient organization; and the authenticity verification of the credential information by the management unit includes a judgment as to whether the hash value acquired from the disc root certificate matches the hash value acquired from the root certificate unique to the recipient organization, and a judgment as to whether the organization ID indicated in the leaf certificate of the first digital certificate chain matches the recipient ID indicated in the credential information.

With the additional technical features described above, the following effect is achieved. Suppose that a plurality eof disc media having different disc root certificates are loaded to and ejected from the application executing device one after another and that each application is assigned with a different root certificate. Even in this case, a first application stored on a disc medium is allowed to access a domain are allocated to a second application stored on another disc medium. As in this case, the present invention with the additional features ensures shared use of a plurality of domain areas among applications stored on mutually different disc media and assigned with mutually different disc root certificates. This makes it easier for application creators to take associative and cooperative approaches.

Technical Features (5): the disc medium has recorded thereon a second digital certificate chain; and the authenticity verification of the credential information by the management unit further includes acquisition of a hash value from a root certificate of the second digital certificate chain and a judgment as to whether the acquired hash value matches the hash value acquired from the root certificate unique to the provider organization, and a judgment as to whether an organization ID indicated in a leaf certificate of the second digital certificate chain matches the provider ID.

With the additional technical features described above, tampering of credential information is prevented. In addition, unauthorized access is prevented since access to a domain area allocated to another application is not permitted without credential information.

Technical Features (6): the credential information further includes a file list; and the permission by the allocation unit for use of the organization area includes permitting the application to access a file that is contained in the organization area and that is listed in the file list.

With the additional technical features described above, the application executing device is enabled to carry out more detailed access control. As a result, the risk of data corruption due to application errors is reduced.

Technical Features (7): the credential information further includes access information indicating an access type permitted for the file listed in the file list; and the permission by the allocation unit for use of the organization area includes permitting the application to make access of the indicated type to the file listed in the file list.

With the additional technical features described above, the application executing device is enabled to reduce the risk of data corruption due to application errors, even in the case the application makes access permitted by the credential information.

Technical Features (8): the disc medium has recorded thereon a first digital certificate chain; the authenticity verification by the management unit includes a judgment as to whether the hash value acquired from the disc root certificate matches a hash value acquired from a root certificate of the first digital certificate chain; and the execution unit is operable to execute the application if the two hash values match.

With the additional technical features described above, the application executing device is enabled to prevent an attack attempted through malicious uses of Interprocess Communication (IPC), thereby improving security.

BRIEF DESCRIPTION OF THE DRAWINGS

FIG. 2A illustrates an example data structure of a Credential;

FIG. 2B illustrates a specific example of a Credential;

FIG. 9 illustrates an example of management information held by the application manager 2;

FIG. 10 is illustrates an example of management information held by the application manager 2;

FIG. 13 illustrates an example of a hash management table held by a security manager 5;

REFERENCE NUMERALS

1 BD Drive
2 Application Manager
3 Virtual Machine (VM)
4 Hard Disc
5 Security Manager
301 Disc Root Certificate
302 Java™ Archive File
401 Class File
402 Manifest File
403 Signature File
404 Digital Signature File
405 Permission Request File
501 Hash Value of Provider Root Certificate
502 Provider ID
503 Hash Value of Recipient Root Certificate
504 Recipient ID
505 Recipient Application ID
506 File List

BEST MODE FOR CARRYING OUT THE INVENTION

Hereinafter, embodiments of the present invention are described with reference to the accompanying drawings.

First Embodiment

Figure 1A:
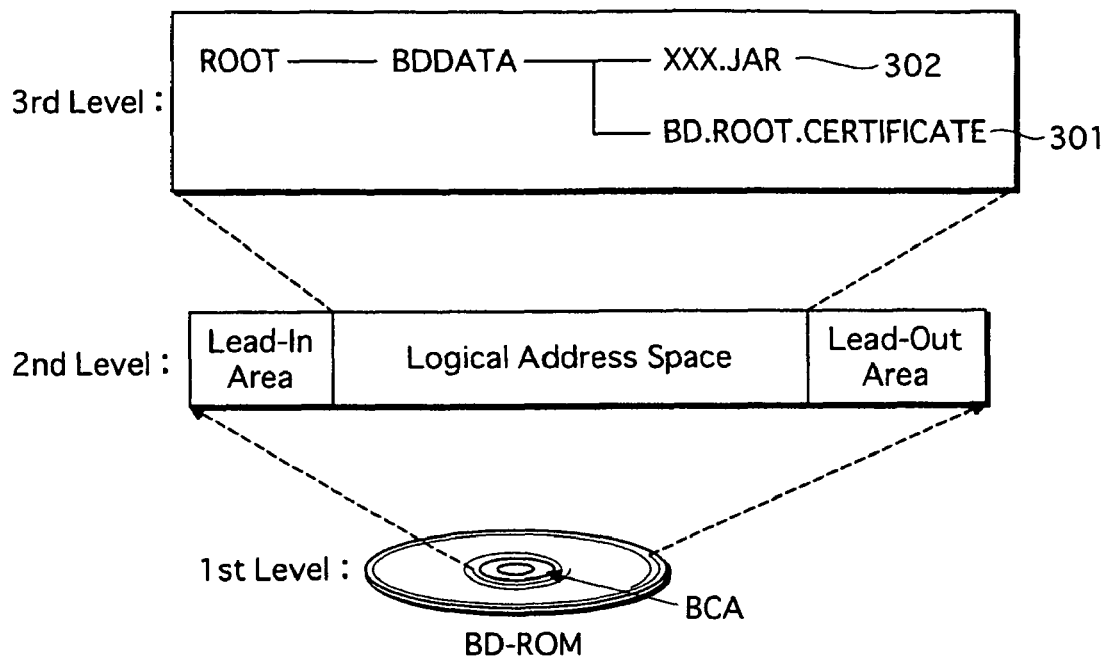
FIG. 1A illustrates the file directory structure of a BD-ROM.

Now, an application executing device according an embodiment of the present invention will be described. First of all, a description is given of a recording medium via which an application is supplied to the application executing device. In the present embodiment, a BD-ROM is taken as an example of the recording medium. It is because an application stored on a BD-ROM performs movie-related processing as described above. FIG. 1A illustrates the file directory structure of the BD-ROM. In the figure, the first level illustrates the BD-ROM. Similarly to other optical discs, such as DVDs and CDs, the BD-ROM has a recording area in a shape of an outwardly extending spiral. In the figure, the recording area is illustrated on the second level in the figure. As illustrated, the recording area includes a "lead-in area" at a radially inward location and a "lead-out area" at a radially outward location. Between the lead-in and lead-out areas is a "logical address space" for storing logical data. In addition, the BD-ROM has a special area called BCA (Burst Cutting Area) inside of the lead-in area. BCA is readable only by a drive and not by any application and thus often used for copyright protection.

The "logical address space" stores various data including file system information (volume) followed by image data and Java™ archive file 302 containing class files and related information. The file system may be compliant with the UDF (Universal Disk Format) or ISO 9660 standard. Similarly to ordinal personal computers, read access to the stored logical data is possible via the directories and files. The third level illustrates the directory and file structure of the BD-ROM. The BD-ROM has a ROOT directory, and a BDDATA directory immediately below the ROOT directory. The BDDATA directory stores files of the following two types.

(A) BD.ROOT.CERTIFICATE: Disc Root Certificate 301

The disc root certificate 301 is issued by a root certificate authority and assigned to the BD-ROM by the BD-ROM creator. The disc certificate 301 is coded in the X.509 format, for example. Specifications of the X.509 format are issued by ITU-T (International Telecommunications Union-Telecommunication) and described in CCITT Recommendation X.509, "The Directory-Authentication Framework, CCITT" (1988). Recording of a root certificate on a portable recording medium involves a relatively high risk that the root certificate would be exposed. In view of the risk, DVD media do not employ the root certificate scheme. It should be noted, however, that copyright protection adopted in BD-ROM media is more sophisticated as compared with the copyright protection adopted in DVD media. The adoption of such sophisticated copyright protection has worked favorably for the adoption of "unique root certificate assignment to individual BD-ROMs". Attention should be paid to the above-described background on the adoption of the disc root certificate 301.

(B) XXX.JAR: Java™ Archive File 302

The Java™ archive file 302 is compliant with the specifications found at http: //java.sun.com/j2se/1.4.2/docs/guide/jar/jar.html. The Java™ archive file 302 is based on the ZIP file format and specialized for Java™. The contents of Java™ archive file 302 are viewable with commercially available ZIP compression software. The "XXX" is variable and the extension "JAR" is fixed.

Figure 1B:
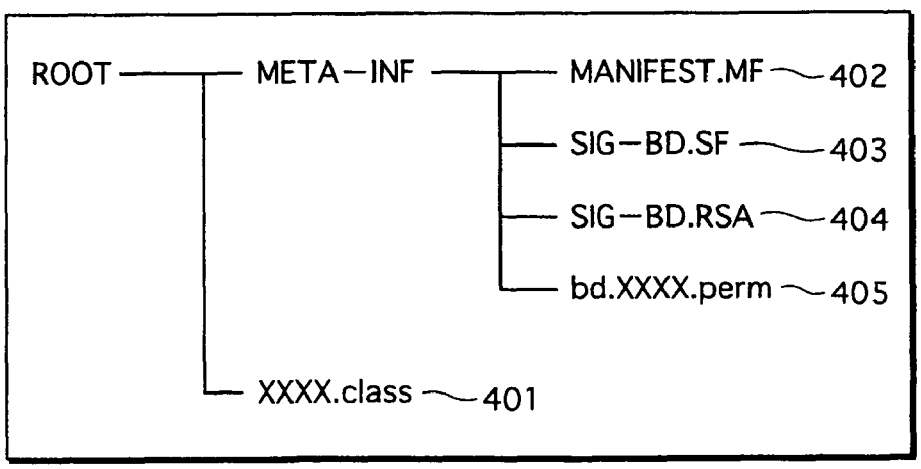
FIG. 1B illustrates an example structure of the contents of a Java™ archive file 302.

The Java™ archive file 302 stores a plurality of files in a directory structure. FIG. 1B illustrates an example structure of the contents of the Java™ archive file 302.

In this structure, the root directory has XXXX.class files 401 and a META-INF directory immediately below the root directory. The META-INF directory contains files called MANIFEST.MF, SIG-BD.SF, SIG-BD.RSA and bd.XXXX.perm. Hereinafter, these files will be described one by one.

(i) XXXX.class: Class File 401

The class files 401 contain a data entity defining a Java™ application that is executable on a virtual machine.

A Java™ application defined by the class files 401 is Java™ Xlet that is controlled by the application manager of the application executing device via an Xlet interface. The Xlet interface has four states, which are "loaded", "paused", "active", and "destroyed".

(ii) MANIFEST.MF: Manifest File 402

The manifest file 402 is provided in correspondence with a digital certificate. The manifest file 402 contains the attributes of the Java™ archive file 302 and the hash values of the class files 401 and data files contained in the Java™ archive file 302. The attributes of the Java™ archive file 302 include an application ID assigned to a Java™ application, which is an instance of the class files 401, and the name of a class file 401 to be executed first for execution of the Java™ archive file 302. In the case where the manifest file 402 does not contain the two attributes of the Java™ archive file 302 described above, the Java™ application, which is an instance of the class files 401 contained in the Java™ archive file 302, is not executed.

(iii) SIG-BD.SF: Signature File 403

The signature file 403 contains the hash value of the manifest file 402.

(iv) SIG-BD.RSA: Digital Signature File 404

The digital signature file 404 contains one or more "digital certificate chain" and "signature data" of the signature file 403.

The "signature data" contained in the signature file 403 is generated by applying a signature process to the signature file 403. The signature process is carried out using a secret key that corresponds to a public key in the digital certificate chain contained in the digital signature file 404.

The "digital certificate chain" refers to a sequence of digital certificates. The first certificate (root certificate) in the sequence sings the second certificate. Similarly, the n-th certificate in the sequence signs the n+1-th certificate. The last certificate in the digital certificate sequence is referred to as a "leaf certificate". With the digital certificate chain, each certificate verifies the next certificate in the root-to-leaf order. Thus, all the certificates in the chain are verified.

The "root certificate" is identical to the disc root certificate 301 contained in the BD.ROOT.CERTIFICATE file.

The "leaf certificate" includes an organization ID. The signature file 403 is stored in the format called PKCS#7, which is a file format used to store one or more signatures and digital certificates. The PKCS#7 format is described in RFC2315 published by IETF (Internet Engineering Task Force). RFC2315 is available for reference at http://www.ietf.org/rfc/rfc2315.txt.

Normally, the digital signature file 404 contains one digital certificate chain. Yet, in the case where authorization is provided as in a later-described example, two digital certificate chains are generated. The two digital certificate chains are referred to as first and second digital certificate chains. Regarding the first digital certificate chain, the root certificate is the disc root certificate of the organization that receives the authorization ("recipient organization"), whereas the leaf certificate includes the organization ID of the recipient organization. Regarding the second digital certificate chain, the root certificate is the disc root certificate of the organization that gives the authorization ("provider organization"), where as the leaf certificate includes the organization ID of the provider organization. In the case where no authorization is provided, the digital signature file 404 contains a single digital certificate chain (first digital certificate chain).

The detailed description of the manifest file 402, signature file 403, and digital signature file 404 is found in the specifications of Java™ archive files. The manifest file 402, signature file 403, and digital signature file 404 are used for the signature process and signature verification. Finally, the Java™ application, which is an instance of the class files contained in the Java™ archive file 302, and a permission request file 405 can be singed using digital certificates. Hereinafter, the manifest file 402, signature file 403, and digital signature file 404 are collectively referred to as "signatures using digital certificates".

(v) bd.XXXX.perm: Permission Request File 405

The permission request file 405 contains information indicating what permission is given to the Java™ application to be executed. More specifically, the permission request file 405 stores the following information:

(a) Credential (Digital Credential Certificate)

(b) Permission for Interprocess Communication (IPC)

Hereinafter, a description of (a) Credential is given. The "Credential" is information used for sharing files in a specific directory belonging to a specific organization. The file sharing is enabled by giving authorization to access the files used by an application belonging to a specific organization to an application belonging to another organization. For this purpose, Credential includes a provider ID identifying the organization that gives authorization to use their applications' files and a receiver ID identifying the organization that receives the authorization.

FIG. 2A illustrates an example data structure of a Credential. The Credential is composed of a hash value 501 of a root certificate issued by a root certificate authority to the provider organization, a provider ID 502 assigned to the provider organization, a hash value 503 of a recipient root certificate issued by the root certificate authority to the recipient organization, a recipient ID 504 assigned to the recipient organization, a recipient application ID 505, and a provided file list 506. The provided file list 506 includes information indicating at least one provided file name 507 and a permitted access type 508 (read access permission or write access permission). The Credential needs to be singed to be valid. Similarly to the digital signature file 404, the Credential may be singed in the PKCS#7 format.

FIG. 2B illustrates a specific example of a Credential. The Credential shown in the figure permits read access to the file "4/5/scores.txt" and write access to the file "4/5/etc/settings.txt".

Next, (b) Interprocess Communication will be described. Normally, a Java™ application included in one Java™ archive file 302 is not permitted to communicate with any other Java™ applications included in other Java™ archive files 302 (i.e., interprocess communication is not permitted). Yet, interprocess communication is possible if the permission request file 405 indicates that such permission is given.

This concludes the description of the permission request file 405. Now, root certificates are described in greater detail.

Figure 3A:
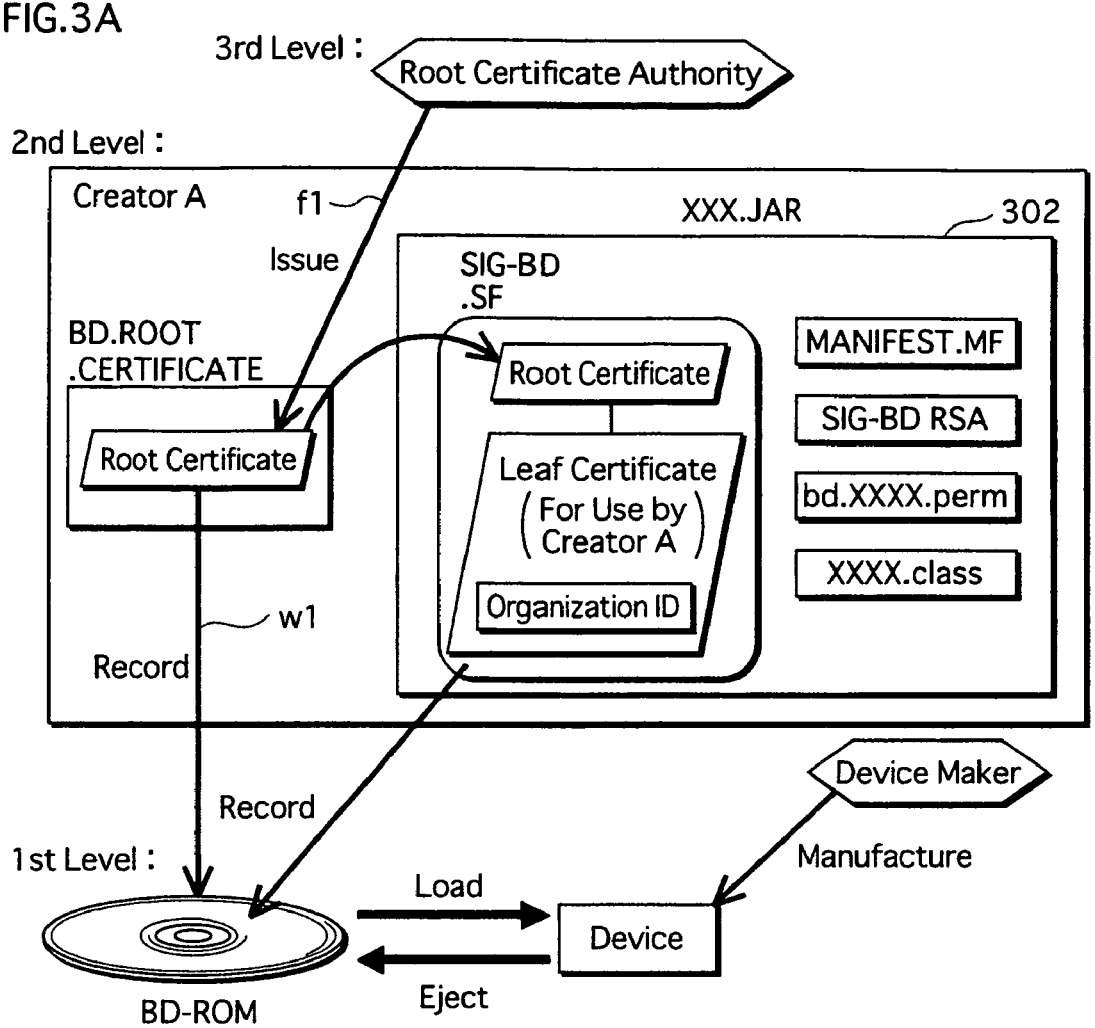
FIG. 3A schematically illustrates how a root certificate is assigned to the BD-ROM.

FIG. 3A schematically illustrates how a root certificate is assigned to the BD-ROM. The first level in the figure illustrates a device (application executing device) and the BD-ROM loaded to the device. The second level illustrates the BD-ROM creator and the device maker. The third level illustrates the root certificate authority that manages root certificates.

In the figure, the BD-ROM creator receives a root certificate issued by the root certificate authority (arrow f1), assigns the received root certificate as a disc root certificate 301 to the BD-ROM, and stores the root certificate into the BD.ROOT. CERTIFICATE file on the BD-ROM (arrow w1). At the time of creating the Java™ archive file 302, the BD-ROM creator stores the root certificate and a leaf certificate that indicates the organization ID into the SIG-BD.SF directory. As a result, the certificates are contained in the Java™ archive file 302.

Although not part of the embodiments of the present invention, a description is now given of the root certificate assignment according to MHP for comparison purposes.

Figure 3B:
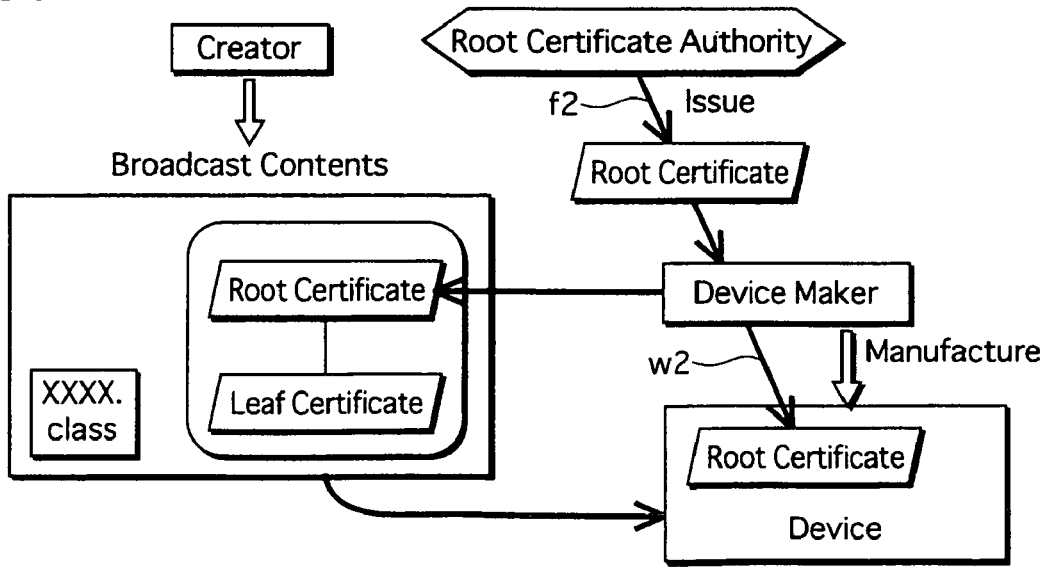
FIG. 3B schematically illustrates how a root certificate is assigned according to MHP.

FIG. 3B schematically illustrates how a root certificate is assigned according to MHP. According to MHP, a device maker receives a root certificate issued by the root certificate authority (arrow f2), the device maker assigns the root certificate to a device (arrow w2). On the other hand, a creator of a broadcast content sends to the device a class file defining the application, along with the root certificate and the leaf certificate that indicates the organization ID identifying the creator organization. The comparison of the figures shows that the root certificate is assigned to the device according to MHP. According to the present embodiment, on the other hand, the root certificate is assigned to the BD-ROM and the certificate chain is generated using, as the base certificate, the root certificate assigned to the BD-ROM.

The same holds in the case where the Java™ archive file 302 is downloaded from a www server into the storage device of the application executing device, rather than being read from a BD-ROM. The download is a way to update the BD-ROM contents. At the time of downloading, a root certificate that is identical to the root certificate contained as the disc root certificate 301 in the BD.ROOT.CERTIFICATE file is stored into the SIG-BD.SF file in the he Java™ archive file. With this arrangement, the application executing device is allowed to verify, using the disc root certificate 301 assigned to the BD-ROM, the authenticity of the Java™ archive file 302 downloaded for the purpose of updating the BD-ROM contents.

Figure 4:
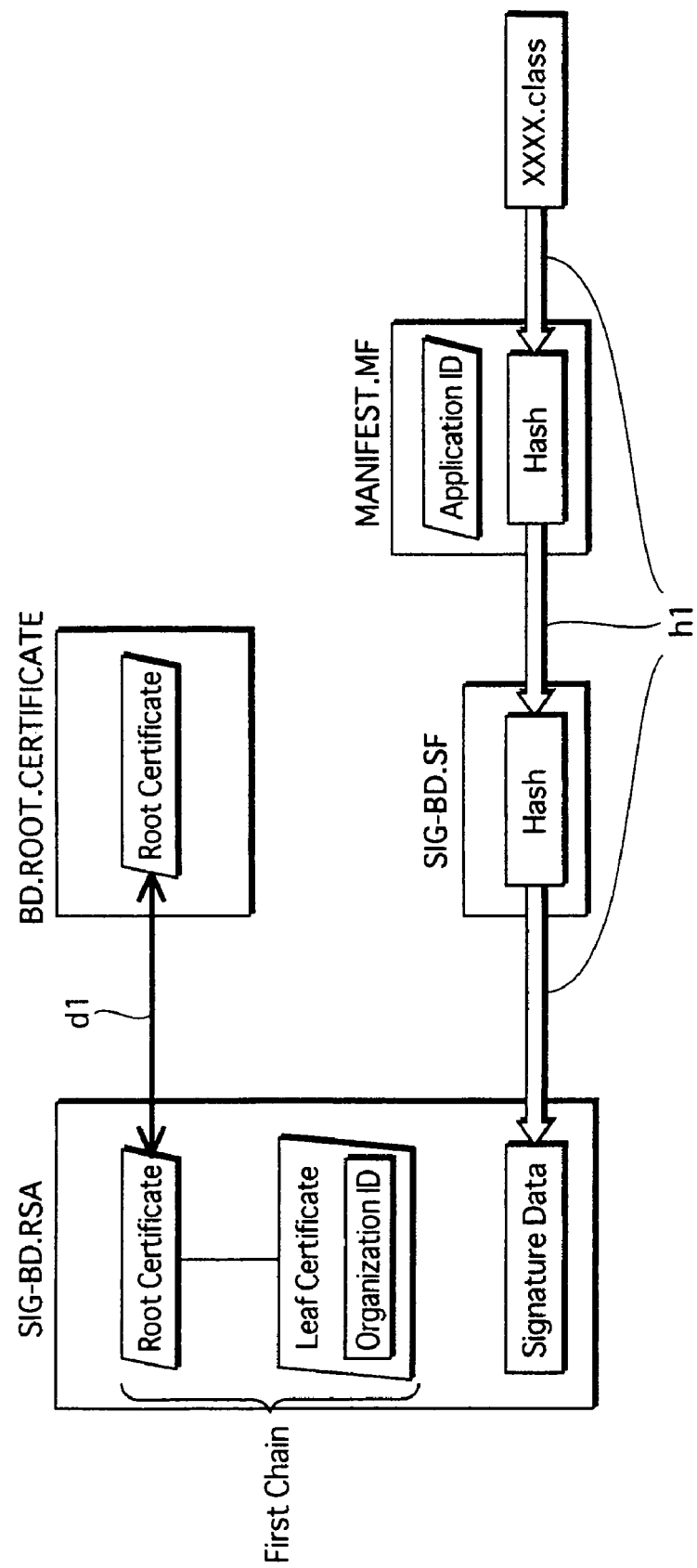
FIG. 4 illustrates the relation among SIG-BD.RSA, SIG-.BD.SF, and BD.ROOT.CERTIFICATE files, in the case where no authorization is provided.

FIG. 4 illustrates the relation between the SIG-BD.SF and BD.ROOT.CERTIFICATE files, in the case where no authorization is provided. An arrow d1 in the figure illustrates that the information elements contained in the respective files are identical. In the case where no authorization is provided, the root certificate (disc root certificate 301) of the BD.ROOT. CERTIFICATE file is identical to the root certificate contained in the first digital certificate chain contained in the SIG-BD.RSA file.

The MANIFEST.MF file sings the class file called XXXX. class, the SIG-BD.SF file contains the hash value calculated from the MANIFEST.MF file, and the SIG-BD.RSA file contains the hash value calculated from the SIG-BD.SF file (arrows h1). Thus, by verifying those signatures and checking if the respective pairs of information elements shown in the figure are identical, the application executing device is enabled to judge whether the Java™ archive file 302 is valid or has been tampered. Since no authenticity is provided in this specific example, the bd.XXXX.perm file is not illustrated in the figure.

Figure 5:
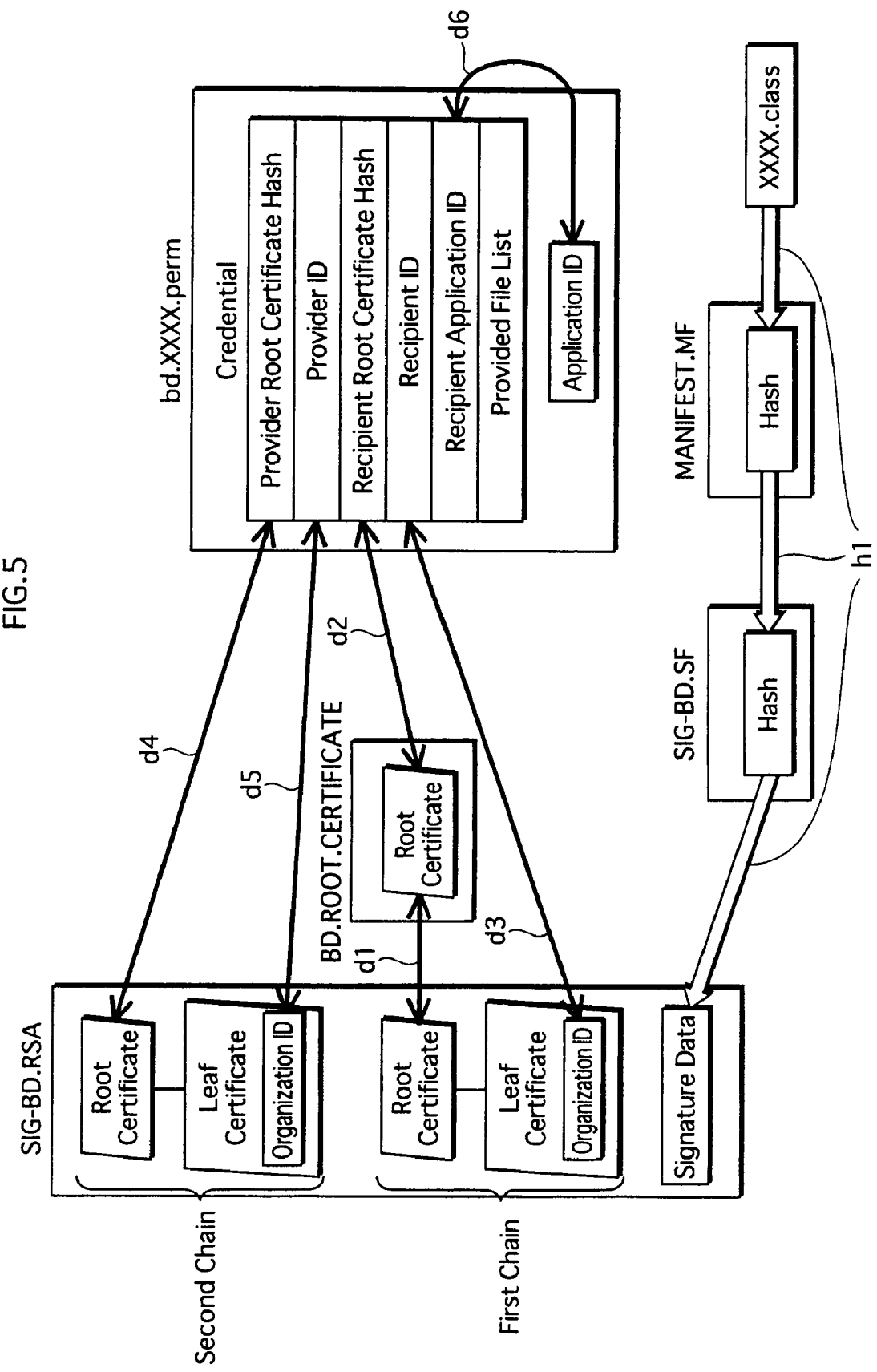
FIG. 5 illustrates the relation among SIG-BD.RSA, SIG-BD.SF, BD.ROOT.CERTIFICATE, MANIFEST.MF, and bd.XXXX.perm files, in the case where authorization is provided.

FIG. 5 illustrates the relation among the SIG-BD.RSA, SIG-BD.SF, BD.ROOT.CERTIFICATE, and bd.XXXX. perm files, in the case where authorization is provided. Arrows d1-d6 in the figure connects mutually identical information elements contained in those files. Similarly to the above example, the root certificate (disc root certificate) contained in the BD.ROOT.CERTIFICATE file is identical to the root certificate of the first digital certificate chain contained in the SIG-BD.RSA file (arrow d1). Different from the above example, however, in the case where authorization is provided, the disc root certificate 301 contained in the BD.ROOT.CERTIFICATE file is of the recipient. Thus, the root certificate contained in the BD.ROOT.CERTIFICATE is identical to the recipient root certificate in Credential contained in the bd.XXXX.perm file (arrow d2). In addition, the recipient ID in the Credential is identical to the leaf organization ID of in the first digital certificate chain (arrow d3).

The root certificate of the provider organization included in the Credential that is contained in the bd.XXXX.perm file is identical to the root certificate in the second digital certificate chain contained in the SIG-BD.RSA file (arrow d4). Further, the provider ID included in the Credential is identical to the organization ID indicated in the leaf certificate of the second digital certificate chain (arrow d5). The recipient application ID included in the Credential is identical to an application ID that is contained in the bd.XXXX.perm file but not in the Credential (arrow d6).

The MANIFEST.MF file contains a hash value calculated from the XXXX.class file. The SIG-BD.SF file contains the hash value calculated from the MANIFEST.M file. The SIG-BD.RSA file contains a hash value calculated from the SIG- BD.SF file (arrow h1). Thus, by verifying the signatures and checking whether the respective pairs of information elements shown in the figure are identical, the application executing device is enabled to judge whether the Java™ archive file 302 is valid or has been tampered. It should be noted that the present embodiment judges whether the two root certificates are identical by comparing hash values calculated from the respective root certificates to see if the two hash values match. In addition, it is a common practice that once calculated, the hash values are stored in memory or the like and supplied for further use without another calculation. The calculation of a hash value and fetching of a hash value from memory are both referred to as "acquisition" of a hash value.

This concludes the description of the BD-ROM. Now, a description is given of the internal structure of the application executing device according to the present invention.

For manufacturing the application executing device according to the present embodiment, a computer system composed of CPU, ROM, RAM, hard disk drive, BD-ROM drive, AV decoder, I/O devices, and the like is prepared. The computer system is then fully equipped with Java™ 2 Micro_Edition (J2ME) Personal Basis Profile (PBP 1.0) and Globally Executable MHP specification (GEM1.0.2) for package media targets, so that Java™ platform is constructed. The application executing devices according to the present embodiment may be manufactured on an industrial scale, by providing the following functional components to Java™ platform.

Figure 6:
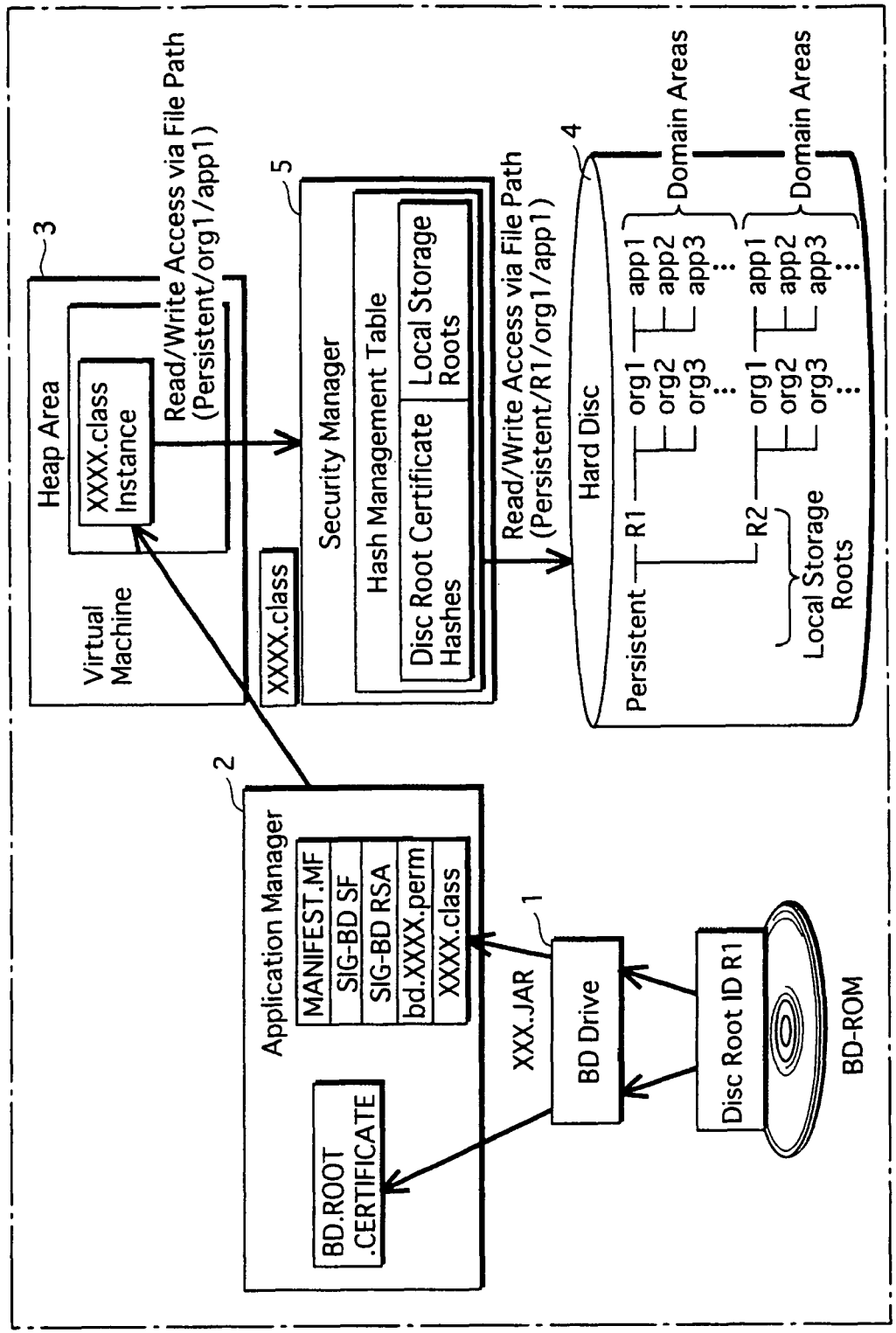
FIG. 6 is a block diagram showing the functional blocks of an application executing device according to a first embodiment of the present invention.

FIG. 6 is a block diagram showing the functional blocks of the application executing device according to the present embodiment. The application executing device is composed of a BD drive 1, an application manager 2, a virtual machine 3, a hard disk 4, and a security manager 5.

(BD Drive 1)

The BD drive 1 loads/ejects a BD-ROM and accesses data stored on the BD-ROM. Upon loading/ejecting a BD-ROM, the BD drive 1 notifies the application manager 2 about the loading/ejection.

(Application Manager 2)

The application manager 2 is a system application that runs in the heap area of the virtual machine 3 and executes application signaling. Generally, the "application signaling" refers to control on MHP, which is defined by the GEM1.0.2 specifications, to activate and execute an application during a lifecycle of a "service". The application manager 2 according to the present embodiment carries out such control that an application is activated and executed during a lifecycle of a "BD-ROM title" rather than a "service". The term "title" refers to a logical playback unit of video and audio data stored on the BD-ROM. An application management table (AMT) is uniquely assigned to each title.

Before activating an application, the application manager 2 verifies the authenticity of the application. The authenticity verification is made through the following steps. In response to loading of the BD-ROM, the application manager 2 checks whether the file called /BDDATA/BD.ROOT.CERTIFICATE is stored on the BD-ROM. If the file is stored, the application manager 2 reads the disc root certificate 301 from the BD-ROM into memory. Then, the application manager 2 reads the Java™ archive file 302 and verifies the authenticity of signatures contained in the Java™ archive file 302. If the signatures are successfully verified, the application manager 2 reads the class files 401 from the Java™ archive file 302 stored on the BD-ROM into the virtual machine 3. Then, the application manager 2 generates an instance of the class files 401 in the heap area. As a result, the Java™ application is activated.

(Virtual Machine 3)

The virtual machine 3 is an entity executing Java™ applications. The virtual machine 3 is composed of a user class loader, a heap, a thread, and a Java™ stack. The user class loader is for reading class files from the BD-ROM. The heap memory is for storing a Java™ application, which is an instance of class files. The thread is a logical entity executing a method of a Java™ application. The thread performs operations using local variables and arguments that are stored on the operand stack and stores the results of operations to local variables or the operand stack. The thread executes a method by converting the method written in bytecode into native code of the CPU and issuing the native code to the CPU. The conversion into native code is not particularly relevant to the gist of the present invention. Thus, no further description thereof is given. If the Java™ archive file 302 contains the permission request file 405, the manifest file 402 must contain a correct hash value. Otherwise, the Java™ application cannot be executed. In order to make the judgment on the correctness of the hash value, the virtual machine 3 stores, in the memory, information indicating the Java™ archive files 302 that contains the Java™ application targeted for execution. With reference to the permission request file 405, the virtual machine 3 can check whether the application held by the application manager 2 is permitted to perform interprocess communication and accordingly provides the interprocess communication functionality to the Java™ application.

(Hard Disk 4)

The hard disk 4 is a local storage accessible using a method in the Java™ IO Package. The local storage has a plurality of domain areas. The domain areas are directories provided correspondingly to different disc root certificates (R1 and R2 in the figure). Below one of the domain area directories corresponding to the root certificate 301, separate directories (org1, org2, and org3 in the figure) are provided for respective organizations. The organization directories are similar to the organization directories provided according to MHP. In other words, the local storage has separate directories for respective applications supplied from respective organizations just as those defined by MHP (org1/app1, brg1/app2, org1/app3 . . . in the figure). Yet, those directories are provided below different directories corresponding to different root certificates (R1 and R2 in the figure). With this directory structure, compatibility with the MHP storage scheme is ensured. Here, part of a file path specifying as far as a local storage directory corresponding a root certificate (Root/R1 and Root/R2 in the figure) is referred to as a "local storage root".

(Security Manager 5)

The security manager 5 holds a hash management table showing pairs each composed of a hash value calculated from a root certificate and a corresponding local storage root. On receiving a file read/write access request from an application, the security manager 5 calculates a hash value from a root certificate corresponding to the application issued the access request, and selects the local storage root corresponding to the hash value from the hash management table. The thus selected local storage root is incorporated into the file path. In addition, the security manager 5 replaces, in accordance with the Credential, part of the file path specifying the directory corresponding to the organization ID. With this arrangement, the file path used by the application ensures compatibility with a file path defined in the format according to MHP.

Hereinafter, a specific description is given of software implementation of the application manager 2 and the security manager 5. The application manager 2 is implemented in the application executing apparatus by preparing a program showing in FIG. 7 and causing the CPU to execute the program.

Figure 7:
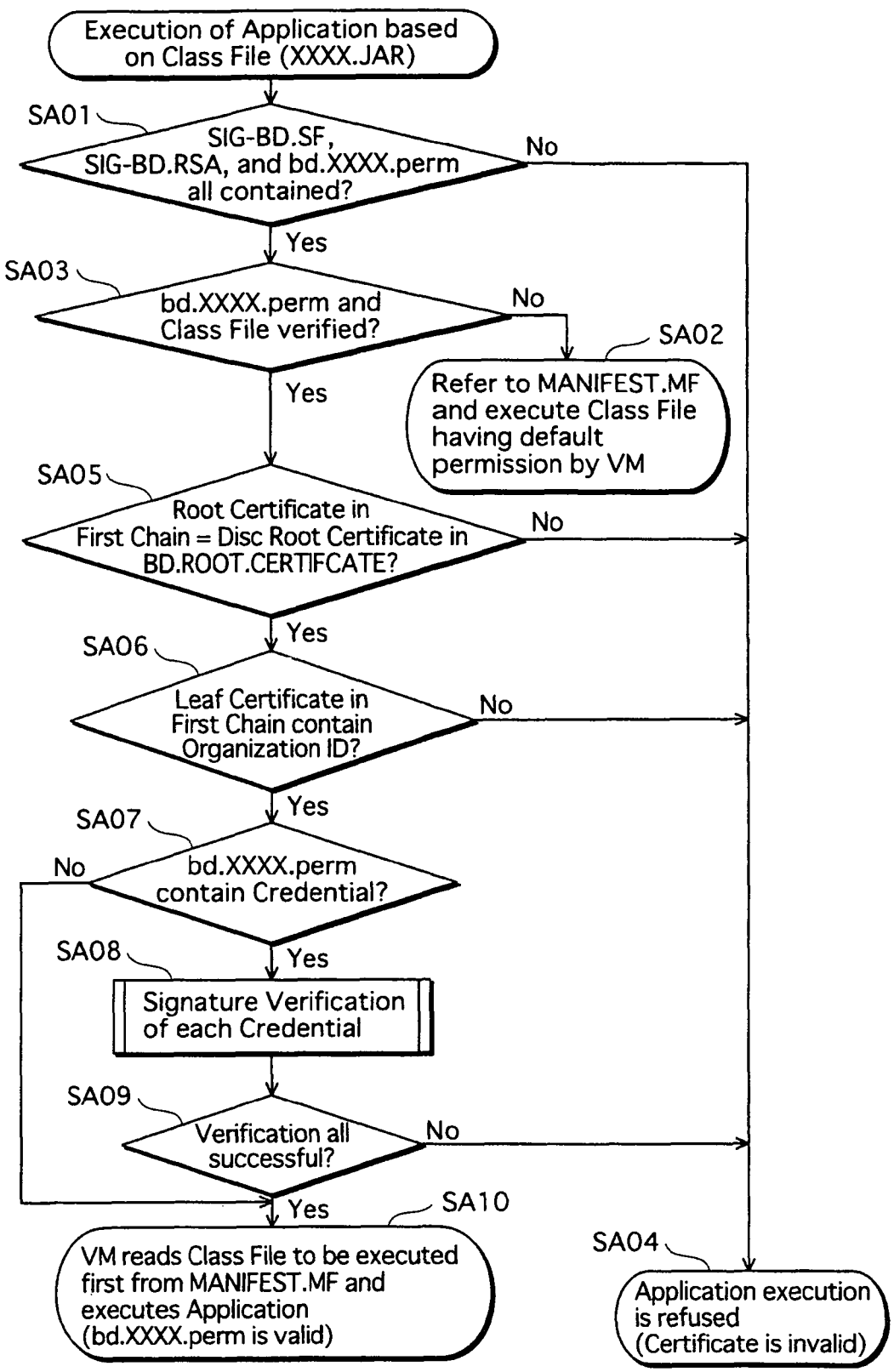
FIG. 7 shows a flowchart of processing steps performed by an application manger 2 for activating an application, which is an instance created according to the definition of class files contained in a Java™ archive file 302.

FIG. 7 shows a flowchart of processing steps for activating an application, which is an instance created according to the definition of the class files 401 contained in the Java™ archive file 302. The application manager 2 judges whether the Java™ archive file 302 contains SIG-BD.SF, SIG-BD.RSA, and bd.XXXX.perm files (SA01). If any of the files are contained, there is a risk that the Java™ application has been tampered, so that execution of the Java™ application is refused (SA04).

If all the three files are contained, the application manager 2 performs signature verification of the bd.XXXX.perm file and of the Java™ application, using the MANIFEST.MF, SIG-BD.SF, and SIG-BD.RSA files (SA03). If the signature verification fails, the application manager 2 stores information that no valid bd.XXXX.perm is contained. The application manager 2 thus causes the virtual machine 3 to execute a class file having default permission (SA02).

If the signature verification is successful, on the other hand, the application manager 2 judges whether the root certificate of the first digital certificate chain is identical to the disc root certificate 301 contained in the BD.ROOT.CERTIFICATE file (SA05). If the two root certificates do not match, the application manager 2 judges that the Java™ archive file 302 is not valid, so that execution of the Java™ application is refused (SA04).

If the two root certificates are identical to each other, the application manager 2 then judges whether an organization ID is indicated in the leaf certificate of the first digital certificate chain (SA06). If no organization ID is indicated, the application manager 2 judges that the Java™ archive file 302 is not valid, so that execution of the Java™ application is refused (SA04).

On the other hand, if an organization ID is indicated, the application manager 2 judges whether the bd.XXXX.perm file contains a Credential (SA07). If no Credential is contained, Step SA10 is performed next.

If a Credential is contained, on the other hand, the application manager 2 verifies authenticity of the Credential (SA08). The verification process will be described later in detail. In the case where a plurality of Credentials is contained, the verification process repeatedly performed for each Credential.

If any of the Credentials is failed to be verified (SA09: NO), the application manager 2 judges that the Java™ archive file 302 is not valid, so that execution of the Java™ application is refused (SA04).

If all the Credentials are successfully verified or if no Credential is contained in the bd.XXXX.perm file, the application manager 2 stores the bd.XXXX.perm file, the organization ID, and the application ID that is contained in the MANIFEST.MF file. The application manager 2 then causes the virtual machine to read one of the class files 401 to be executed first from the MANIFEST.MF file. As a result, the Java™ application created by instantiating the read class file is executed (SA 10).

Figure 8:
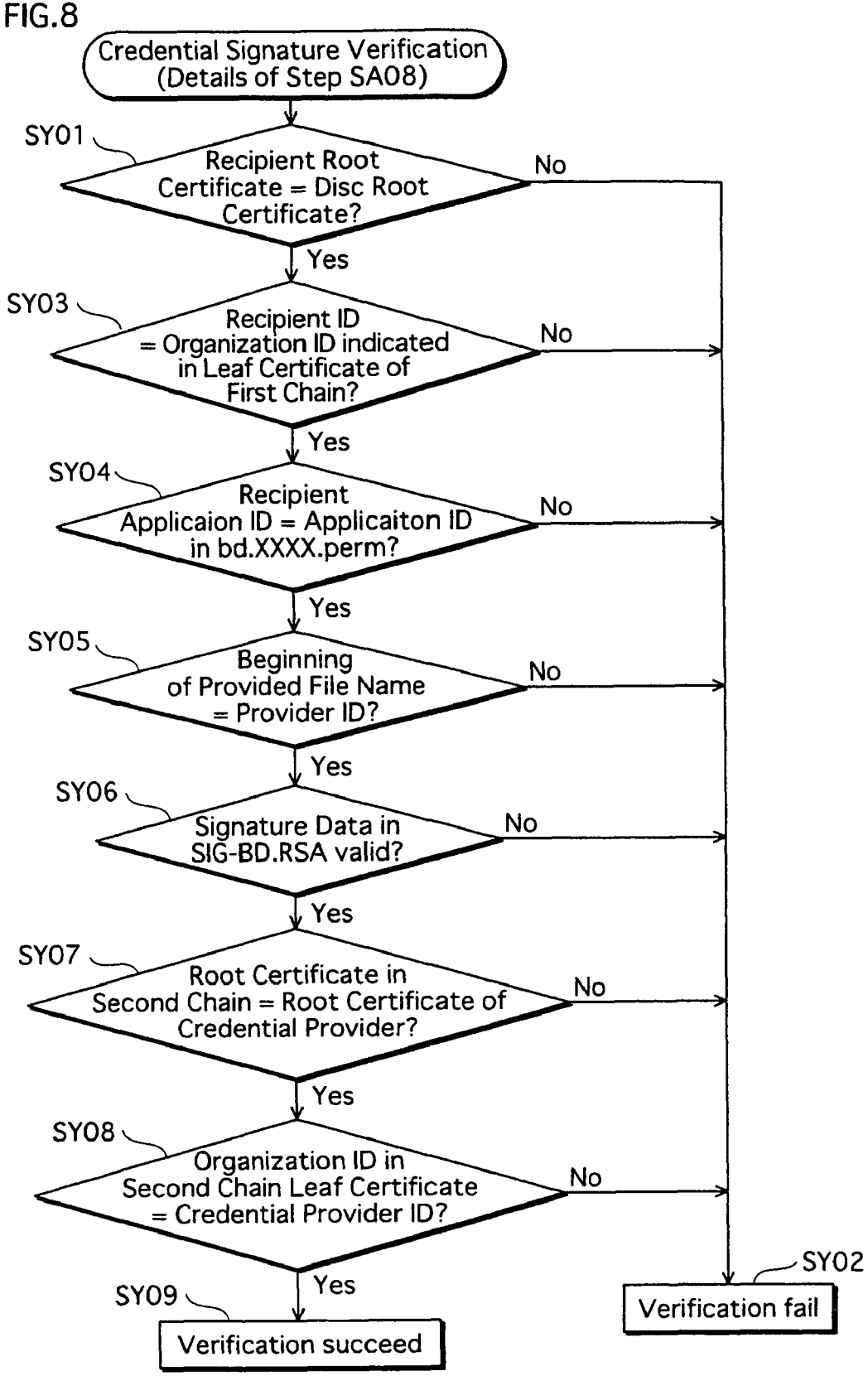
FIG. 8 shows a flowchart of processing steps performed by the application manager 2 for signature verification of the Credential.

FIG. 8 shows a flowchart of processing steps performed by the application manager 2 for signature verification of the Credential. Now, a description of the flowchart is given.

First of all, the application manager 2 judges whether the hash value 503 of the recipient root certificate matches the disc root certificate 301 contained in the BD.ROOT.CERTIFICATE file (SY01). If they do not match, the verification fails (SY02).

Next, the application manager 2 judges whether the recipient ID 504 matches the organization ID indicated in the leaf certificate in the first digital certificate chain (SY03). If they do not match, the verification fails (SY02).

Next, the application manager 2 judges whether the recipient application ID 505 matches any application ID contained in the bd.XXXX.perm file but not in the Credential (SY04). If there is no match, the verification fails (SY02) Next, the application manager 2 judges whether the provider ID 502 matches the first part of any supplied file name included in the Credential (SY05). If there is no match, the verification fails (SY02).

Next, the authenticity of signature data contained in the SIG-BD.RSA file is verified (SY06). If the signature data is not valid, there is a risk that the Credential has been tampered and thus the verification fails (SY02).

If the signature data is valid, the application manager 2 judges whether the hash value of the root certificate of the second digital certificate chain matches the hash value of the provider root certificate contained in the Credential (SY07). If the two hash values do not match, the verification fails (SY02).

Next, the application manager 2 judges whether the organization ID of the leaf certificate in the second digital certificate chain matches the provider ID 502 indicated in the Credential (SY08). If the two organization IDs do not match, the Credential is not valid and thus the verification fails (SY02).

The verification is successful if all the judgments result in the affirmative (SY09).

FIG. 9 illustrates an example of management information held by the application manager 2 of the application executing device according to the present embodiment. The application manager 2 manages the disc root certificate 301 and also manages, in tabular form, the "Jar File Name", "Organization ID", "Application ID", "Interprocess Communication", and "Credential" of the Java™ archive file 302 being executed.

FIG. 10 illustrates an example of a row of the Credential table contained in the management information held by the application manager 2 of the application executing device according to the present invention. The Credential table is composed of columns of the "Provider Root Certificate Hash" 501, the "Provider ID" 502, and the "Provided File List" 506. The "Provided File List" 506 contains a listing of provided file names 507 along with an access type 508 permitted for a respective file.

In the case permission is given to the Java™ archive file 302, the virtual machine 3 performs the following processing prior to execution of the Java™ application. The virtual machine 3 judges whether the hash value of the Java™ application contained in the MANIFEST.MF file matches the actual hash value of the Java™ application. If the two hash values do not match, execution of the Java™ application is refused.

Figure 11:
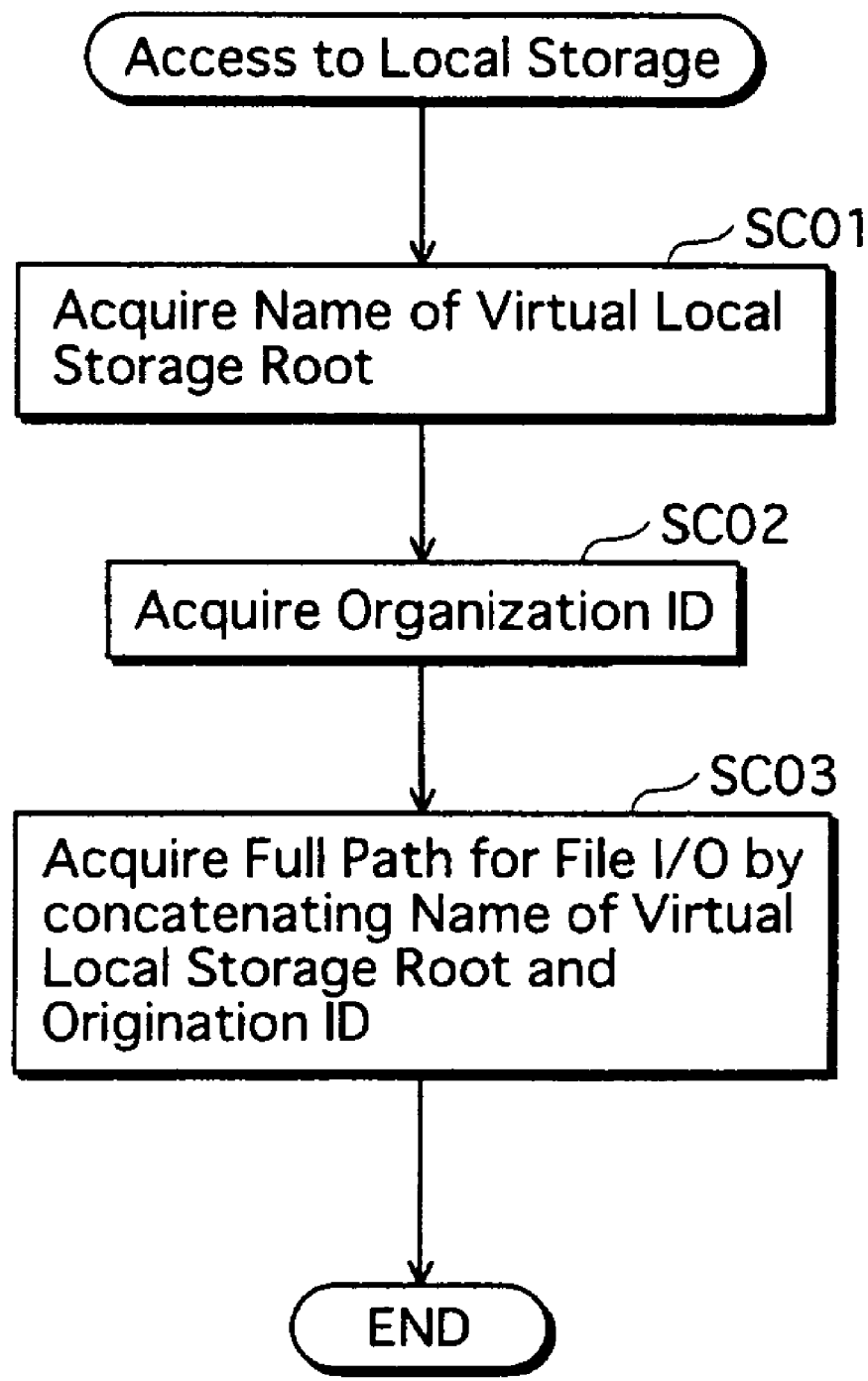
FIG. 11 shows a flowchart of processing steps performed when a Java™ application uses a hard disk 4.

The Java™ application is executed by the virtual machine 3. With reference to FIG. 11, the processing steps performed when a typical Java™ application requests the use of the local storage.

FIG. 11 shows a flowchart of processing steps performed when a Java™ application uses the hard disk 4.

The Java™ application acquires a virtual local storage root (SC01). The virtual local storage root is a file path specifying, in the MHP file path format, the file to be accessed and is expressed with the character string "/Root" or "/Storage/Root". The virtual local storage root is used to ensure compatibility with the MHP file path format. At the time when the Java™ application makes a file access to the hard disk 4, the local storage name is converted into a local storage root that is uniquely defined for a respective root certificate.

Next, the Java™ application acquires an organization ID (SC02). The organization ID in this example is the numeral "4".

The Java™ application concatenates the local storage root name with the organization ID to specify the name of file to which a requested read or write access is to be made (SC03). For example, in the case where the local storage root name is "/persistent/0003", the organization ID is "7", and the relative path of the requested file is "8/scores.txt", the requested file is specified with the full path "/persistent/0003/7/8/scores.txt".

For the Java™ application to perform the processing steps shown in FIG. 11, the security manager 5 provides the following function calls.

Figure 12:
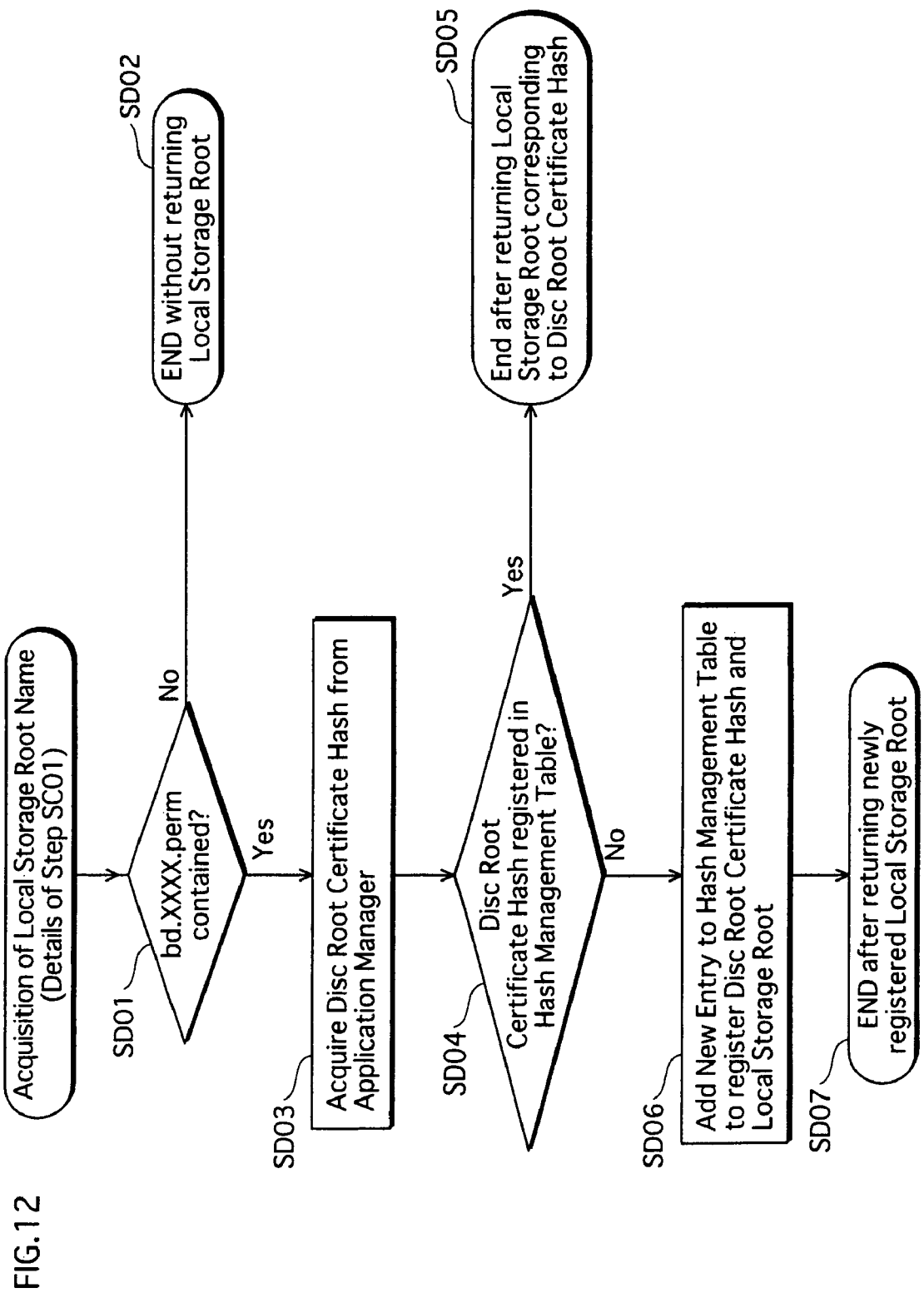
FIG. 12 shows a flowchart of processing steps performed by the Java™ application for acquiring a local storage root name.

(a) Local Storage Root Acquisition;
(b) Organization ID Acquisition;
(c) Read Access to File
(d) Write Access to File FIG. 12 shows a flowchart of processing steps performed by the Java™ application to execute a function call "Local Storage Root Acquisition". Now, a description of the flowchart is given.

First, the security manager 5 judges whether the calling Java™ application is provided with a bd.XXXX.perm file (SD01). In order to judge whether or not the bd.XXXX.perm file exists, the security manager 5 acquires, from the virtual machine 3, the Java™ archive file 302 containing the class files 401 of which instance is that Java™ application. If the Java™ archive file 302 contains no bd.XXXX.perm, the "acquisition of the local storage root" is refused (SD02).

If a bd.XXXX.perm file exists, the security manager 5 acquires the hash value of the disc root certificate 301 from the application manager 2 (SD03). With reference to a hash management table (which will be described later), the security manager 5 judge whether the hash value of the disc root certificate 301 has been already registered (SD04) If the hash value is already registered, the security manager 5 returns, to the Java™ application, the local storage root corresponding to the hash value of the disc root certificate (SD05).

If the hash value of the disc root certificate 301 is not yet registered in the hash management table, the security manager 5 adds a new entry (SD06). The new entry is composed of the hash value of the disc root certificate 301 and the local storage root that is unique within the table. The security manager 5 then returns, to the Java™ application, the newly registered local storage root (SD07).

FIG. 13 illustrates an example of a hash management table held by the security manager 5. The hash management table provides a listing of hash values 1301 of different root certificates along with local storage roots 1302 corresponding to the respective hash values 1301. In the figure, the local storage root "/0001" and "/0003" correspond to the directories "/R1" and "/R2" shown in FIG. 6, respectively. The local storage roots 1302 are in a one-to-one correspondence with the hash values 1301 of root certificates Consequently, if two or more BD-ROMs have the same disc root certificate 301, the same local storage root 1302 is returned for every application that is an instance of class files 401 contained in a Java™ archive file 302. On the other hand, if BD-ROMs have different disc root certificates 301, different local storage roots 1302 are returned for each application that is an instance of class files contained in a respective Java™ archive file 302.

Figure 14:
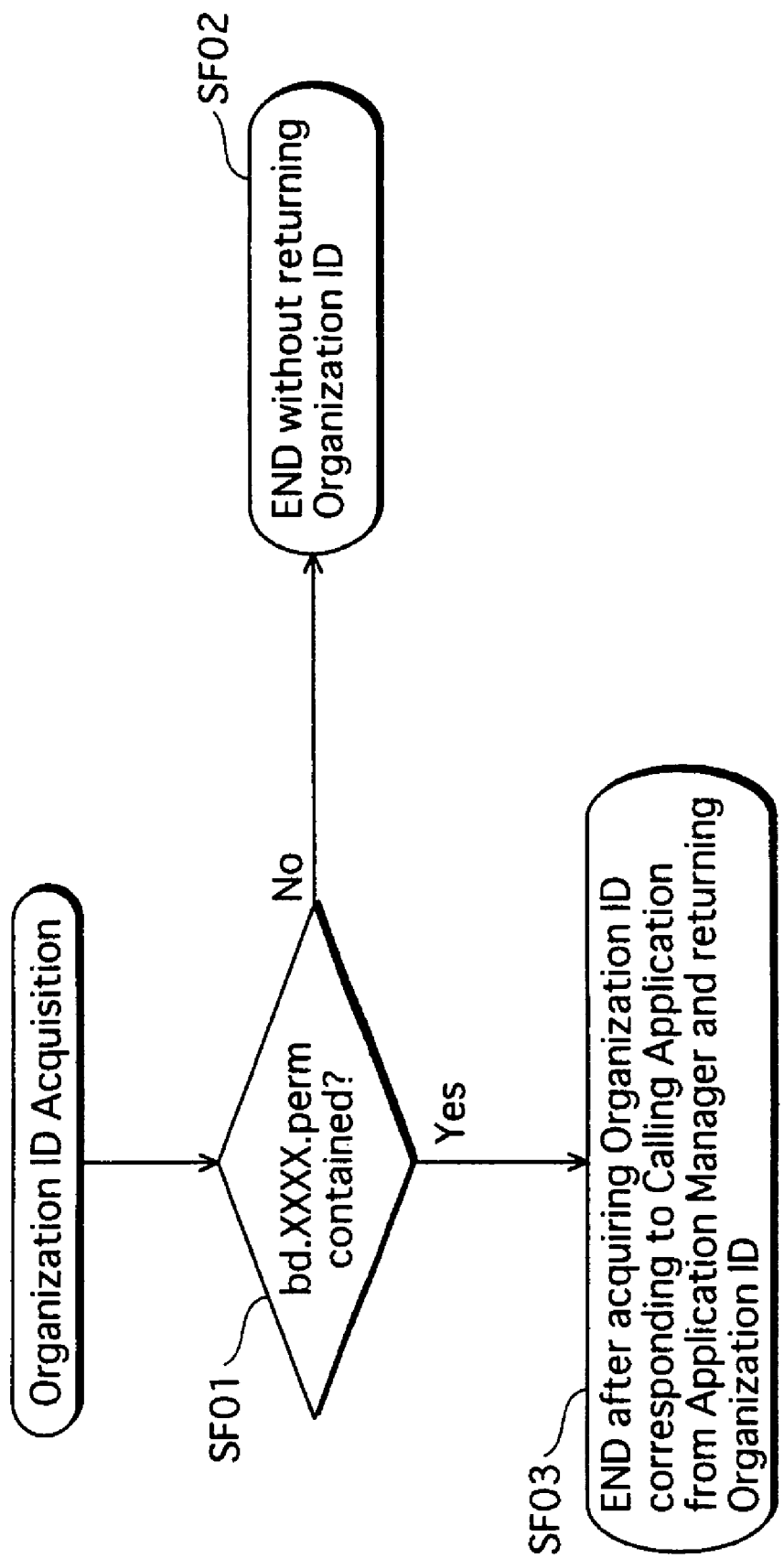
FIG. 14 shows a flowchart of processing steps performed by the security manager 5 for acquiring an organization ID.

FIG. 14 shows a flowchart of processing steps performed for function call "Organization ID Acquisition". Now, a description of the flowchart is given.

First of all, the security manager 5 judges whether the calling Java™ application is provided with a bd.XXXX.perm file (SF01). If no bd.XXXX.perm file is provided, it is not possible to specify the organization ID. Thus, the "organization ID-acquisition" is refused (SF02). On the other hand, if a bd.XXXX.perm file is provided, the security manager 5 acquires the organization ID corresponding to the Java™ application from the application manager 2 and returns the acquired organization ID to the Java™ application (SF03).

With the function call "Read Access to File", the Java™ application passes the full path of the requested file as the parameter to the security manager 5. The full path is in the format "Organization ID/Application ID/". The application attempts to access the file stored in the application executing device, through the same procedure used to access files in the MHP local storage.

Figure 15:
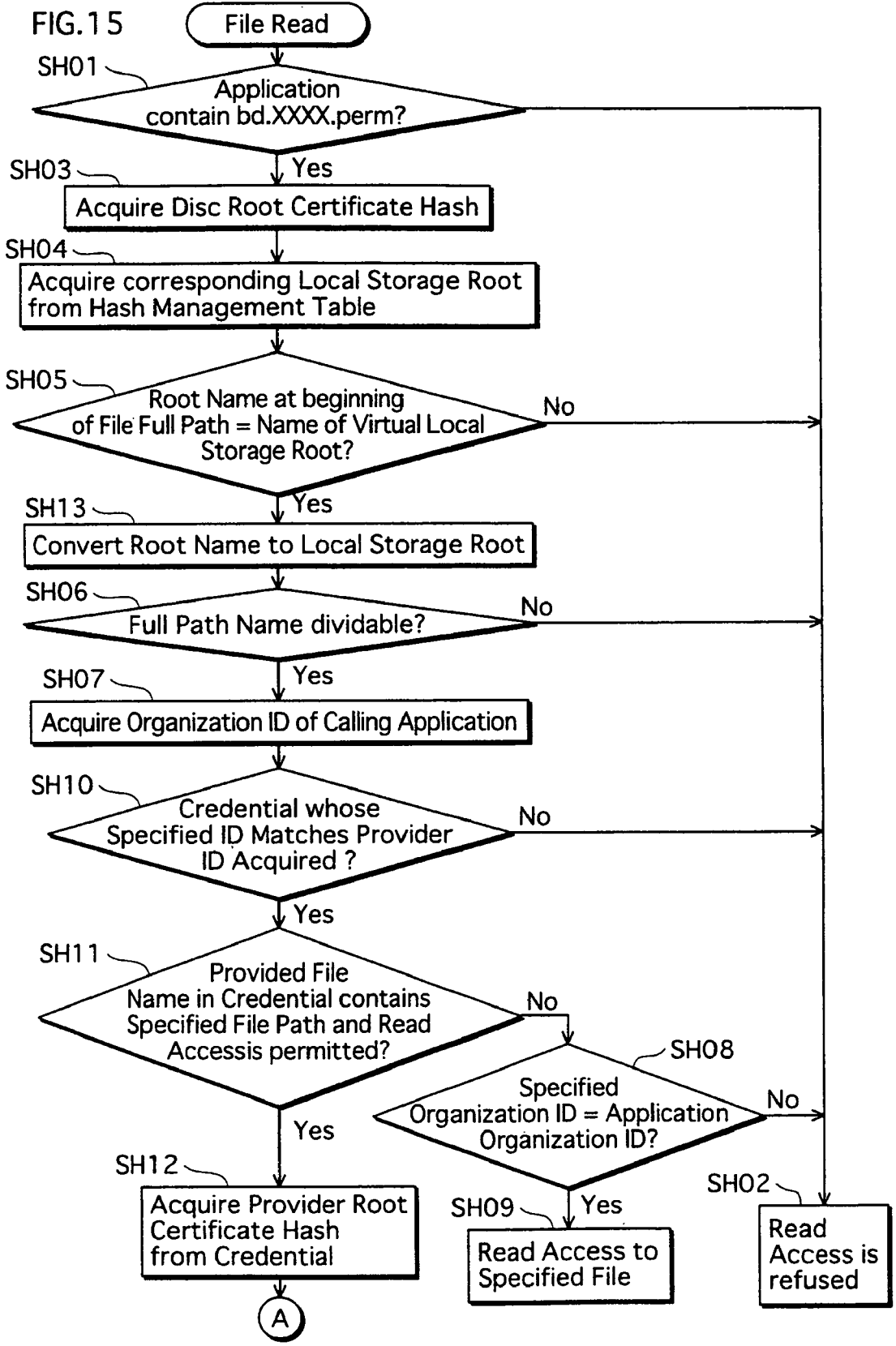
FIG. 15 shows a flowchart of processing steps performed by the security manager 5 for executing read access to a file.
Figure 16:
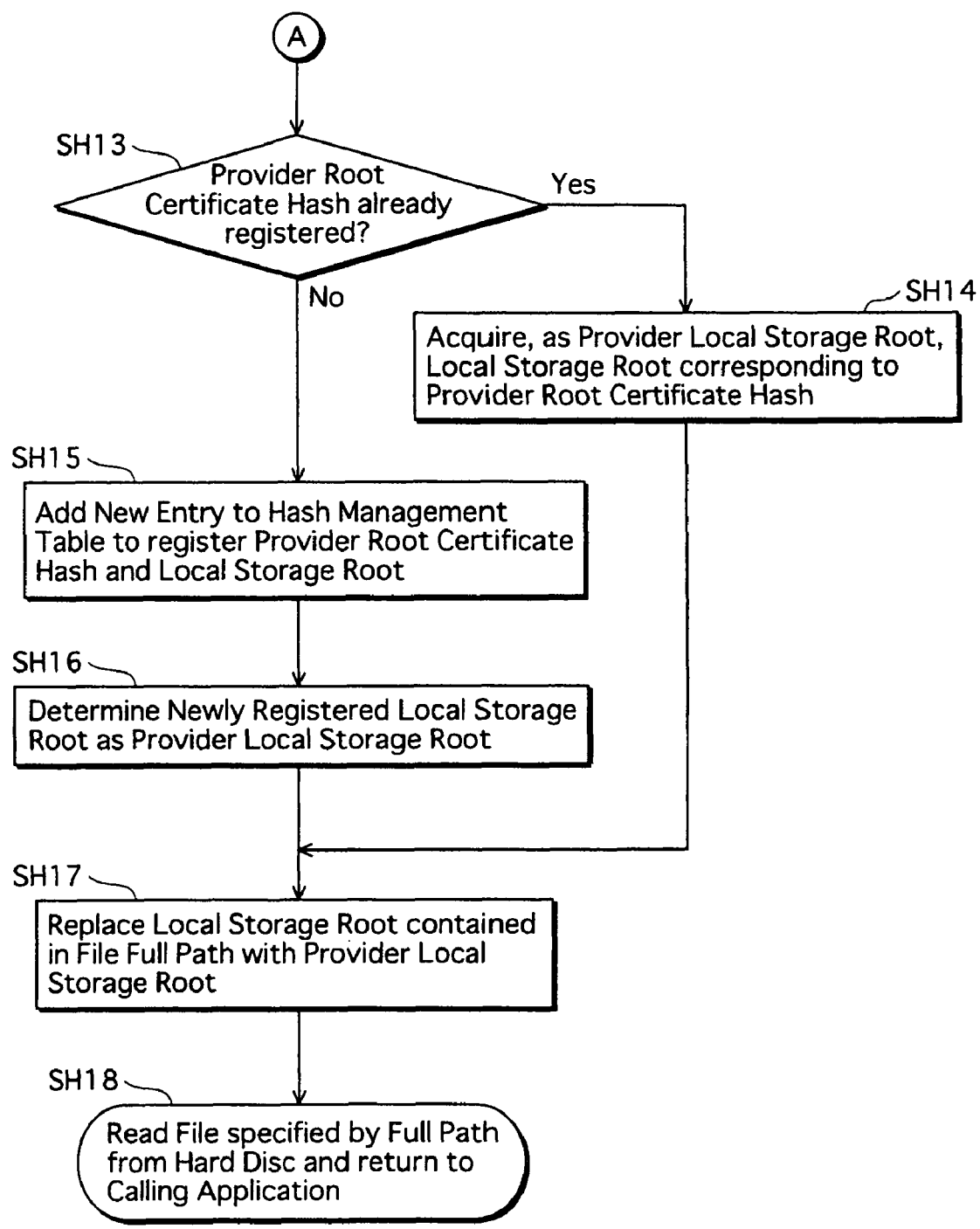
FIG. 16 shows the flowchart of processing steps performed by the security manager 5 for executing read access to a file.

If the file access is successfully made, the security manager 5 returns the fetched data to the Java™ application. FIGS. 15 and 16 show a flowchart of processing steps for executing the function call "Read Access to File". Now, a description of the flowchart is given.

First of all, the security manager 5 judges whether the calling Java™ application is provided with a bd.XXXX.perm (SH01). If no bd.XXXX.perm file is provided, the requested "Read Access to File" is refused (SH02).

On the other hand, if a bd.XXXX.perm is provided, the security manager 5 acquires the hash value of the disc root certificate 301 from the application manager 2 (SH03).

The security manager 5 retrieves a local storage root 1302 corresponding to the hash value of the disc root certificate 301 from the hash management table (SH04).

Next, the security manager 5 judges whether the root name at the beginning of the full path specifying the file name matches the name of the virtual local storage root (SH05). This judgment is made in order to check whether the requested file is specified by the file path in the format compliant with the device (in this example, the format compatible with the MHP format). If there is a match, the root name is converted into a corresponding local storage root, which is a format compliant with the disc root certificate (SH13). If there is no match, the requested file access is refused (SH02).

Here, the full path before the conversion is as follows.
Full Path specified by Application:
/virtual local storage root/specified organization ID/specified path
The path after conversion in Step SH05 is as follows.
/local storage root/specified organization ID/specified path Next, the security manager 5 divides the full path of the file (SH06). The full path of the file is specified in the format "local storage root 1302" "specified organization ID" and "specified path" that are concatenated with "/" in the stated order. Thus, the full path is dividable into the local storage root 1302, the specified ID, and the specified path. If the full path is not dividable, the requested read access is refused (SH02).

The security manager 5 acquires the organization ID of the calling Java™ application from the application manager 2 (SH07). Then, the security manager 5 attempts to acquire, from the application manager 2, a Credential of which provider ID 502 matches the specified organization ID (SH10). If such a Credential cannot be acquired, a requested read access is refused (HS02).

On the other hand, if such a Credential is successfully acquired, the security manager 5 then judges whether the path specified by the Java™ application is found in the provided file names 507 indicated in the Credential and whether the corresponding access type 508 indicates read access permission (SH11). If read access is permitted, the security manager 5 acquires the hash value 501 of the provider root certificate from the Credential (SH12).

If read access is not permitted, the security manager 5 judges whether the specified organization ID matches the organization ID of the Java™ application (SH08). If the two IDs match, the security manager 5 reads a file from the hard disk via the full path specified by the application and returns the read file to the Java™ application (SH09). If the two IDs do not match, the requested read access is refused (SH02).

The security manager 5 judges whether the hash value 501 of the provider root certificate is already registered in the hash management table (SH13). If the hash value 501 is already registered, the security manager 5 acquires the local storage root 1302 that corresponds to the hash value 501 of the provider root certificate and determines the acquired local storage root 1302 as the provider local storage root (SH14).

In the case where the hash value 501 of the provider root certificate is not registered in the hash-management table, the security manager 5 adds a new entry to the hash management table (SH15). The new entry is composed of the hash value 501 of the provider root certificate and the local storage root that is unique within the table.

The security manager 5 determines the newly added local storage root 1302 as the provider local storage root (SH16).

After determining the provider local storage root, the security manager 5 converts the full path of the file name by replacing the local storage root 1302 with the provider local storage root (SH17).

The security manager 5 reads the converted full path from the hard disk 4 and returns the read full path to the Java™ application (SH18).

This concludes the description of read access to a file. Next, a description of write access to a file is given.

Figure 17:
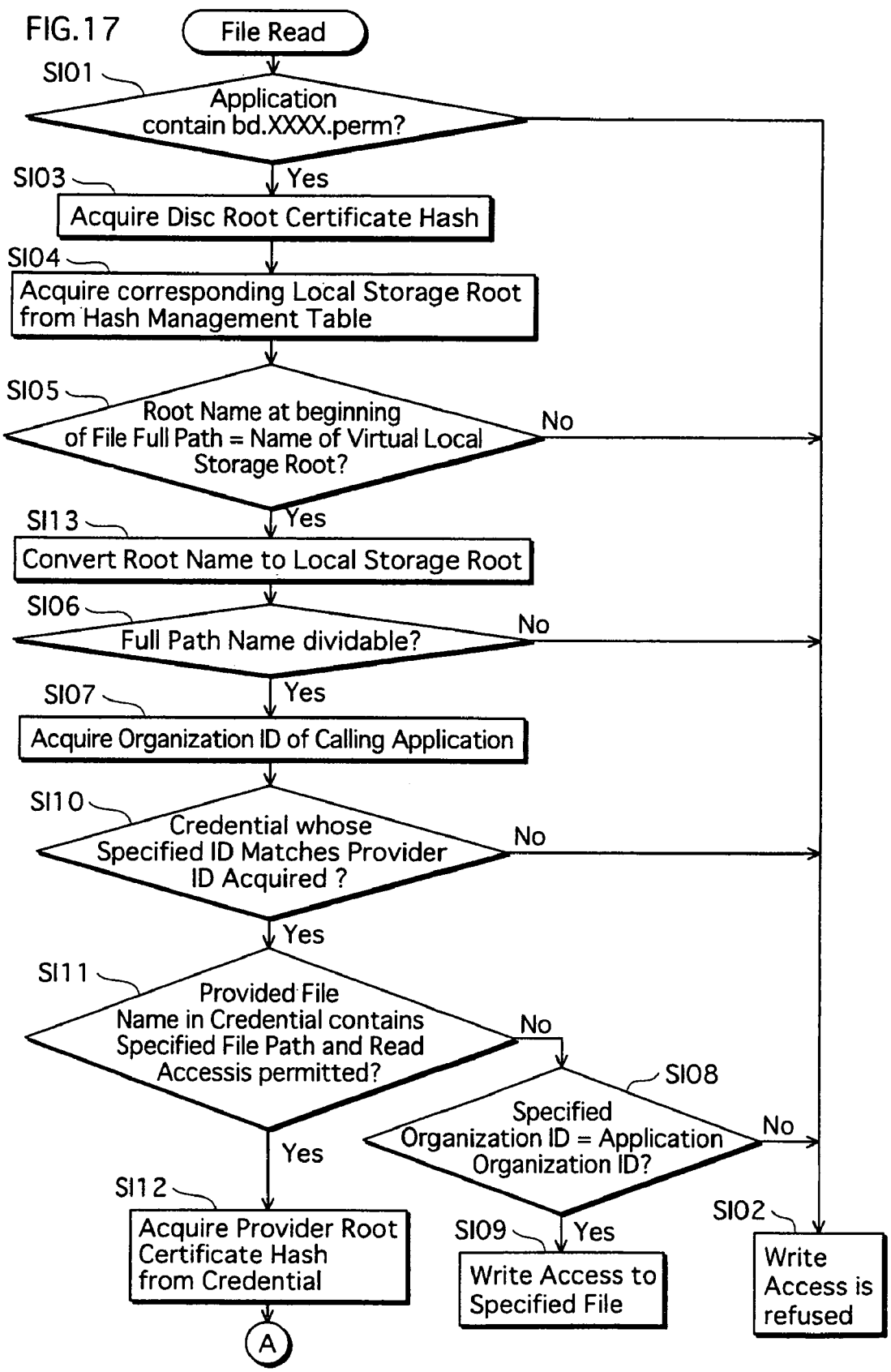
FIG. 17 shows a flowchart of processing steps performed by the security manager 5 for executing write access to a file.
Figure 18:
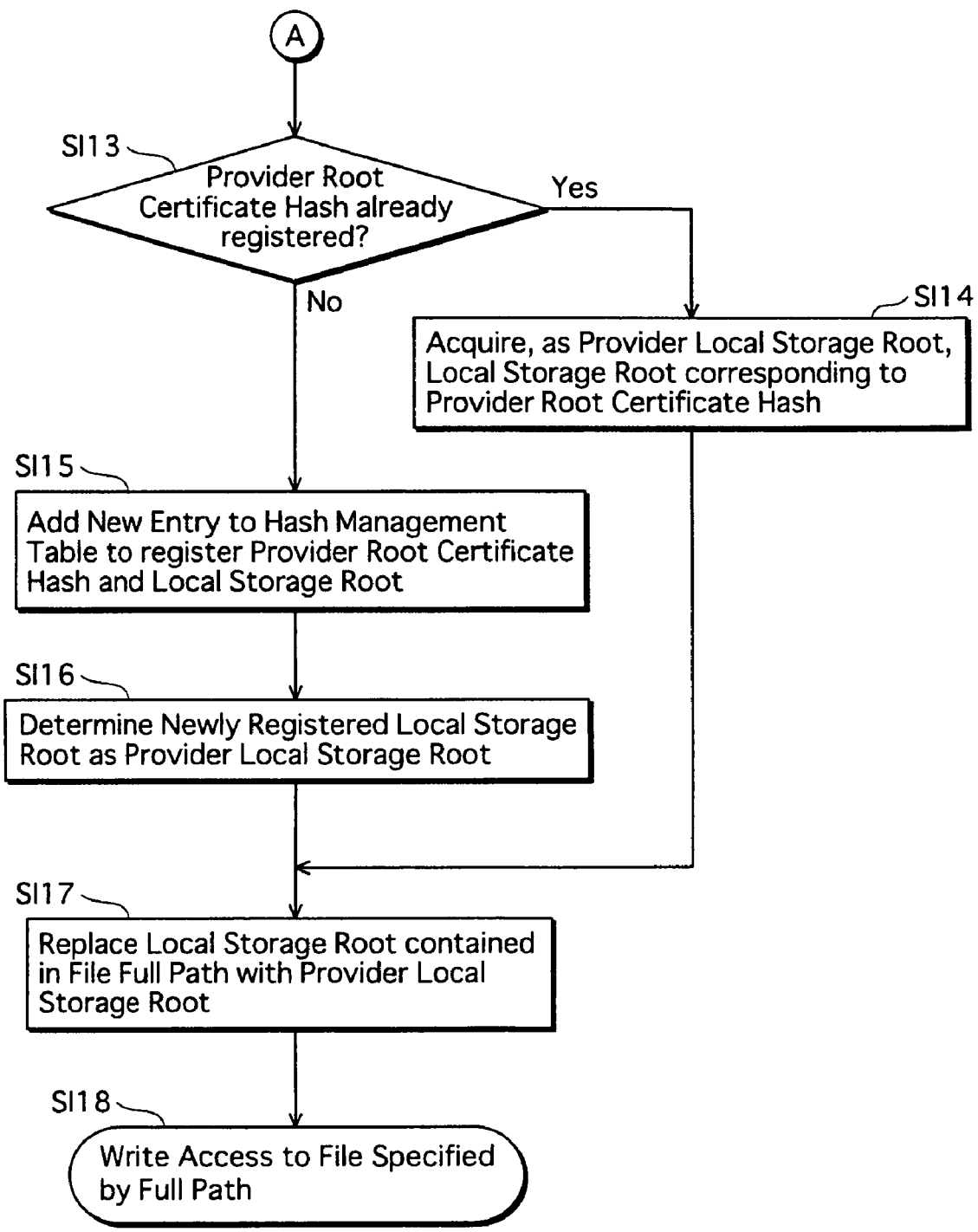
FIG. 18 shows the flowchart of processing steps performed by the security manager 5 for executing write access to a file.

At the time of function call "Write Access to File", the Java™ application passes parameters to the security manager 5. The parameters include the full path of a requested file along with data requested to be written to the file. If successful, the security manager 5 writes the data to the file. FIGS. 17 and 18 show a flowchart of processing steps for function call "Write Access to File". Now, a description of the flowchart is given.

First, the security manager 5 judges whether the calling Java™ application is provided with a bd.XXXX.perm file (SI01). If there is no bd.XXXX.perm, the requested "Write Access to File" is refused (SI02).

On the other hand, if a bd.XXXX.perm is provided, the application manager 2 acquires the hash value of the disc root certificate 301 (SI03).

The security manager retrieves a local storage root 1302 that corresponds to the hash value of the disc root certificate 301 from the hash management table (SI04).

Next, the security manager 5 judges whether the root name at the beginning of the full path specifying the file name matches the name of the virtual local storage root (SI05). If there is a match, the root name is converted into a corresponding local storage root (SI13). If there is no match, the requested file access is refused (SI02).

Here, the full path before the conversion is as follows.

Full Path Specified by Application:
/virtual local storage root/specified organization ID/specified path The path after conversion in Step S105 is as follows.
/local storage root/specified organization ID/specified path Next, the security manager 5 divides the full path of the file (SI06). The full path of the file is specified in the format "local storage root 1302" "specified organization ID" and "specified path" that are concatenated with "/" in the stated order. Thus, the full path is dividable into the local storage root 1302, the specified ID, and the specified path. If the full path is not dividable, the requested write access is refused (SI02).

The security manager 5 acquires the organization ID of the calling Java™ application (SI07). Then, the security manager 5 attempts to acquire, from the application manager 2, a Credential of which provider ID 502 matches the specified organization ID (SI10). If such a Credential does not exist, a requested write access is refused (SI02).

On the other hand, if such a Credential is successfully acquired, the security manager 5 then judges whether the path specified by the Java™ application is found in the provided file names 507 indicated in the Credential and whether the corresponding access type 508 indicates write access permission (SI11). If write access is not permitted, the security manager 5 judges whether the specified organization ID matches the organization ID of the Java™ application (SI08). If the two IDs match, the security manager 5 makes write access to the file via the full path (SI09). If the two IDs do not match, the requested write access is refused (SI02).

If it is confirmed that write access is permitted, the security manager 5 acquires the hash value of the provider root certificate from the Credential (SI12).

The security manager 5 judges whether the hash value 501 of the provider root certificate is already registered in the hash management table (SI13). If the hash value 501 is already registered, the security manager 5 acquires the local storage root 1302 that corresponds to the hash value 501 of the provider root certificate and determines the acquired local storage root 1302 as the provider local storage root (SI14).

In the case where the hash value 501 of the provider root certificate is not registered in the hash management table, the security manager 5 adds a new entry to the hash management table (SI15). The new entry is composed of the hash value 501 of the provider root certificate and the local storage root 1302 that is unique within the table.

The security manager 5 determines the newly added local storage root 1302 as the provider local storage root (SI16).

After determining the provider local storage root, the security manager 5 modifies the full path of the file by replacing the local storage root 1302 with the provider local storage root (SI17).

The security manager 5 reads the converted full path of the file from the hard disk 4 and returns the read full path to the Java™ application (SI18).

As described above, according to the present embodiment, the local storage 4 has directories assigned to different root certificate hashes. Thus, by providing storage areas for respective organizations and applications below corresponding directories, it is no longer required that organization IDs are all unique on a worldwide basis. Rather, it is sufficient that organizations are distinguished from one another within a finite "domain area". Thus, the need for ID management by a third-party body is eliminated.

Furthermore, the root certificate is assigned not to the device itself but to a domain area of the storage unit. Thus, as long as the BD-ROM is loaded to the application executing device, it is ensured that the application executing device runs. There still is a risk that the disc root certificate would be exposed. Yet, in that case, it is sufficient to disable that particular BD-ROM or renew the disc root certificate of that particular BD-ROM. Applications supplied via other BD-ROMs remain usable with their original disc root certificates. Consequently, it is reliably ensure that the applications are executable.

As described above, it is reliably ensured that existing applications are executable on the application executing device, without requiring management of organization IDs on a worldwide basis. For this advantage, the application executing device according to the present invention contributes significantly to the worldwide scale standardization of application executing devices for executing applications for movie-related processing.

(Supplemental Note)

Up to this point, the best modes of the present invention known to the applicant at the time of filing the present application. It should be noted, however, that the technical topics listed below may be subject to improvements and/or modification. It is optional to practice the embodiments as described above or to adopt any improvements or modifications. It is a description of those who practice the present invention.

(Selection of Java™ Archive File 302)

The BD-ROM may additionally store other data such as video data. In such a case, selection of Java™ archive files 302 may be made in accordance with an event that occurs during video data playback (playback start of Chapter 2, for example) or a user selection made on a screen.

The digital certificate chain may contain a single certificate. In such a case, the single-certificate is both a root certificate and a leaf certificate.

(Permission Types)

In the case of application executing device having a wider range of functionalities, the bd.XXXX.perm file may have other types of permissions. For example, the bd.XXXX.perm file may contain a plurality of digital credential certificates 312.

(Organization ID)

Depending on the embodiments, an organization ID may be contained in a different file on the BD-ROM. In such a case, it is not necessary to refuse "Organization ID Acquisition". Instead, it is applicable to return an organization ID determined in a different scheme.

(Read/Write Access to Files)

FIGS. 15-18 mainly illustrate file read access. Yet, it is possible that a Java™ application makes access to directories. In the case where access is made to a directory, the full path of a file name may not contain a specified path.

FIGS. 15 and 16 illustrate a function call to read an entire file. Similarly, a function call may be made so as to make a typical file access to fetch partial data of a file.

The control flow shown in FIG. 11 is one example and may very depending on a Java™ application architecture.

(Combined Use with Other System)

The access control system described above may be used in combination with other file access permission system (such as the User-Group-World access model often employed by UNIX™) In such a case, the access control system described above is used in combination with a second access control system according to the following priority.

(a) If the full path is not dividable in Step SH06 or if no digital credential certificate is found in Step SH10, then the second access control system is employed.

(b) In Step SH09, the second access control system is employed.

(c) In the other steps, the access control system of the present embodiment is used by priority.

(Hash Values)

Each hash value used in the present embodiment is generated by applying a secure hash function such as SHA-1 and MD5. With a secure hash function, it is practically impossible to find different data pieces that would result in the same hash value.

(Root Certificate Hash Values)

The hash value of a root certificate described in the present embodiment may not have to be calculated from the entire root certificate. The hash value may be calculated at least from a public key contained in the root certificate. The disc creator can explicitly select one or more secure hash functions used to calculate hash values to be contained in the MANIFEST.MF, SIG-BD.SF, SIG-BD.RSA files.

According to the present embodiment, it is always the same secure hash function that is applied to calculate the hash values 501 and 503 of the provider and recipient root certificates, respectively. Yet, it is possible that the digital credential certificate contained in the bd.XXXX.perm file indicates a secure hash function used in the hash value calculation.

(Comparison of Root Certificates)

The comparison of root certificates in Step SA05 may be made so as to judge whether the two root certificates are identical or whether public keys contained in the respective root certificates are identical. Alternatively, it is applicable to ignore the first certificate (root certificate) in the digital signature file and to judge whether the second certificate subsequent to the root certificate is singed by the disc root certificate 301. In either way, it is ensured that the disc root certificate 301 sings the second one of the digital confiscates contained in the digital signature file. Thus, the same effect is achieved in terms of security.

The comparison in Step SA05 is made mainly in order to prevent an attack made using interprocess communication. An attack may be made through malicious use of interprocess communication with a BD-ROM illicitly created in the following manner.

1. A malicious hacker attempting an attack makes read access to an authentic BD-ROM created by a BD-ROM creator to fetch a Java™ archive file 302 singed by a digital certificate. The Java™ archive file 302 is targeted for attack.

2. The hacker creates a Java™ archive file 302 for an attack and signs it by the digital certificate.

3. The hacker writes, onto the illicit BD-ROM, the authentic Java™ archive file 302 targeted for attack and the illicit Java™ archive file 302 created for making attack.

The two Java™ archive files 302 are both singed by digital certificates but the respective root certificates are mutually different. If an application executing device gives permission for interprocess communication to Java™ applications that are created by instantiating the respective Java™ archive files 302, the illicit Java™ archive file 302 have access to the authentic Java™ archive file 302 being the attack target. As a result, under control by the hacker, the authorized Java™ archive file 302 ends up making unexpected processing to the memory area assigned thereto.

In order to protect against such an attack as described above, the comparison of root certificates made in Step SA05 is necessary. Step SA05 may be replaced with a step of prohibiting interprocess communication between Java™ applications that use different root certificates. It is applicable that a single BD-ROM has a plurality of disc root certificates 301.

(Function of Acquiring Local Storage Name)

According to the above embodiment, in Step SC01 of the function of local storage name acquisition, a virtual local storage name, which is a file path in the compatible format with the MHP format, is once returned to the Java™ application. Then, in Steps SH05 and SI05, the virtual local storage name is replaced with the name of local storage actually provided in the application executing device. Alternatively, however, it is applicable to modify Step SC01 so as to directly return the local storage name retrieved from the hash management table to the Java™ application. This modification eliminates the step of replacing the virtual storage name with a local storage name.

(Title)

When manufacturing an application executing device as a BD-ROM player, it is desirable to provide the application executing device with a "module manager" for selecting a title in response to BD-ROM loading, a user operation, and a device status. The decoder of the BD-ROM player executes playlist playback of an AV clip in accordance with the title selection made by the "module manager".

Upon title selection by the "module manager", the application manager 2 performs signaling using AMTs corresponding to the previous and current titles. The signaling is to carry out such control that execution of applications listed in the AMT corresponding to the previous title but not in the AMT corresponding to the current title is terminated. Instead, execution of applications not listed in the AMT corresponding to the previous title but in the AMT corresponding to the current title is initiated. It is preferable to go through the verification steps of disc root certificates as described above, each time application signaling is performed.

(BD-BOX)

In a case where a single movie or a series of movies is stored on a plurality of BD-ROMs that together make up a so-called BD-BOX, it is preferable that the same disc root certificate 301 is assigned to all the BD-ROMs. If the same disc root certificate 301 is assigned to the plurality of BD-ROMs, some of applications may run continually before and after disc exchange. Such an application running over a period covering both before and after disc exchange is called a "disc unboundary application". Upon disc exchange, the application manager 2 preferably reads a disc root certificate 301 from a newly loaded BD-ROM and judges that the newly read disc root certificate is identical to a disc root certificate 301 contained in the Java™ archive file 302 defining the disc unboundary application. If it is judged that the two disc root certificates are identical, execution of the disc unboundary application is allowed to continue. If it is judged, on the other hand, that the two disc root certificates are not identical, execution of the disc unboundary application is forcefully terminated. With this arrangement, it is ensured that only an authorized application is allowed to continually run before and after BD-ROM exchange.

(Credentials)

Preferably, a Credential is constituted by concatenating data pieces each enclosed within a specific pair of tags and extracted from a plurality of XML documents.

The bd.XXXX.perm file may additionally contain signature data of the Credential. The signature data is the value generated by signing the Credential data using the provider leaf certificate (a public key contained in the provider leaf certificate).

In the case where "Authorization" is provided, there may be a plurality of bd.XXXX.perm files. Yet, in that case, each bd.XXXX.perm file preferably contains information indicating which leaf certificate contained in the SIG-BD.SF is used to verify a respective Credential.

The Credential may be generated by defining the provided file names in the bd.XXXX.perm file and the data entity of the Credential is calculated from values contained in another file.

It is preferable that the bd.XXXX.perm contains provided files, information indicating a leaf certificate, and signature data by combining all of these.

(Local Storage)

According to the above embodiment, the local storage is described as a built-in hard disk. Yet, a portable medium may be employed instead, on condition that the portable medium is a secure recording medium. An SD memory card is one example.

(Packages to be Implemented)

In view of practicing the application executing device, it is preferable to implement the following BD-J Extension on the application executing device. The BD-J Extension contains various packages dedicated to Java™ platform for providing functionalities beyond the GEM [1.0.2]. The packages provided by BD-J Extension include the following.

org.bluray.media

This package provides extra functionalities to the Java™ Media FrameWork. More specifically, the functionalities for effecting angle control and selection of audio and subtitles are added into this package.

org.bluray.ti

This package provides an API used for mapping "Services" of GEM [1.0.2] to "Titles". This package also provides the mechanism for querying the title information from BD-ROM and selecting a new title.

org.bluray.application

This package contains an API for lifecycle management of applications in the signaling necessary to run the application as well as a query API to disc specific lifecycle signaling.

org.bluray.ui

This package defines constants for BD-ROM specific key events and includes a class for frame synchronous animations.

org.bluray.vfs

This package provides binding mechanisms (Binding Scheme) between contents not recorded on BD-ROM (off-the-disc contents) and the corresponding contents recorded on BD-ROM (on-the-disc contents), for realizing seamless playback irrespective of data storage locations.

The Binding Scheme binds contents stored on BD-ROM (AV clips, subtitles, BD-J applications) with related contents stored on the local storage disc. The Binding Scheme enables seamless playback regardless of the storage locations of contents.

(Access to Local Storage)

For example, whether a requested file is located at the file path "/Persistent/1/1/streams/" is confirmed by using the method exits( ) contained in Java™ IO. The following is an example of the method exits( ) of Java™ IO. In this example, a requested file is "0.m2ts". Example:

new Java™.io.File("/Persistent/1/1/streams/0.m2ts").exists( );

(Permission Request File)

The permission request file may determine whether or not to permit the following functionalities.

Use of network connection

BD-ROM access

Selection of other titles on BD-ROM

Execution control of other platforms (Video and Audio)

It is applicable to modify the BD-ROM directory structure shown in FIG. 1A by additionally providing a BDMV directory below the ROOT directory. The BDMV directory may be used to store an AV clip, which is an MPEG2-TS AV stream, and playlist information defining a playback path of the AV clip. The Java™ application may be written to execute playback according to the playlist information.

Suppose that playlist information is contained in a file called "00001.mpls". The Java™ application then creates a JMF player instance according to a JMF library. The method JMF A "BD://00001.mpls"; instructs the virtual machine to create a player instance for executing PL playback. The method "A.play" instructs the JMF player instance to execute playback.

(BD-ROM Content)

According to the above embodiment, an application recorded on the BD-ROM constitutes a movie. Yet, any other applications may be stored on the BD-ROM as long as the applications are executable without being installed on the local storage. Examples of such applications include game software. In addition, although the present embodiment employs a BD-ROM as a disc medium, any other portable and copyrighted recording media may be employed.

(Virtual Package)

It is applicable that the security manager 5 performs processing to create a virtual package. A virtual package refers to a technique of expanding the functionalities of a read-only recording medium, such as a BD-ROM, by dynamically synchronizing a digital stream stored on the read-only recording medium and a digital stream stored on a rewritable recording medium. Examples of the read-only and rewritable media include a BD-ROM and a hard disk, respectively. Here, for example, the digital stream on the BD-ROM provides a main feature movie, where as the digital stream on the hard disk provides a sequel to the main feature movie. The virtual package allows the main feature on the BD-ROM and the sequel on the hard disk to be manipulated and played back as if they constitute a single movie.

To the above end, the security manager 5 generates virtual package information. The virtual package information is an extended version of volume management information of the BD-ROM. Generally, volume management information defines the file-directory structure of a recording medium and is composed of directory management information and file management information. The directory management information relates to directories, and the file management information relates to files. The virtual package information is to expand the directory-file structure of the BD-ROM by adding new file management information. The virtual package information allows an application to access, just in a way to access the BD-ROM, the local storage having organization areas below domain areas corresponding to respective disc root certificates.

(Control Implementation)

The processing steps described with reference to the flowcharts or performed by the functional components are actually realized using hardware resources. Accordingly, the processing steps are said to be a highly advanced creation of technical ideas by which a low of nature is utilized, and thus satisfies the requirements of "program invention".

Program Production According to the Present Invention

A program according to the present invention is a program in a format executable by a computer (i.e. object program). The program is composed of one or more coded instructions for causing a computer to execute the steps of the flowcharts or to implement the functional components. Examples of the program code employed includes various codes, such as a native code of a particular processor and Java ByteCode. In addition, the processing steps of the programs may be implemented in various manners. If a processing step is implemented using an external function, a corresponding coded instruction will be a CALL statement for invoking the external function. In addition, there may be a case where coded instructions that together implementing a single step are contained in separate object programs. In the case of a RISC processor, which is designed for handling reduced instruction sets, each processing step in the flowcharts may be implemented using a combination of an arithmetic instruction, a logical instruction, and a branch instruction.

A program according to the present invention may be produced in the following manner. First, a software developer writes, in a programming language, a source program for implementing the flowcharts or the functional components described above. When writing the source program for implementing the flowcharts or the functional components, the software developer may use class structures, variables, array variables, and calls for external functions, in accordance with the syntax of that programming language.

The resulting source program is supplied as a file to a compiler. The compiler translates the source program into an object program.

The compilation involves processes of parsing, optimization, resource allocation, and code generation. The parsing involves lexical analysis, syntactic analysis, and semantic analysis of the source program, and conversion of the source program into an intermediate program. The optimization involves processes of dividing the intermediate program into basic blocks, and control flow analysis and data flow analysis of the intermediate program. The resource allocation involves a process of allocating registers or memory of a target processor to variables appearing in the intermediate program, whereby the intermediate program is adapted to the instructions sets of the processor. The code generation involves a process of converting intermediate statements of the intermediate program into program code, whereby an object program is generated.

Once the object program is generated, the programmer activates a linker. The linker allocates memory areas for the object program and related library programs, and binds them together to generate a load module. The thus generated load module is to be read by a computer thereby to cause the computer to perform the processing steps shown in the above flowcharts or the processing steps performed by the functional components. Through the above processes, a program embodying the present invention is created.

Usage of Program According to the Present Invention

The program according to the present invention may be used in the following manners.

(i) As Embedded Program

When the program according to the present invention is used as an embedded program, a load module that is equivalent to the program is recorded into an instruction ROM, along with a basic input output program (BIOS) and various pieces of middleware (operation systems). The instruction ROM is then built into the control unit and executed by the CPU. As a result, the program according to the present invention is used as the control program of the application executing device.

(ii) As Application Program

In the case where the application executing device is provided with an internal hard disk, a Basic Input/Output System (BIOS) is embedded in advance within the instruction ROM, and middleware (operation system) is preinstalled onto the hard disk. In addition, the application executing device is provided with a boot ROM for activating the system from the hard disk.

Thus, in this case, the load module is solely supplied to the application executing device via a portable recording medium or a network, and the load module is installed as a single application program onto the hard disk. Then, the application executing device bootstraps to activate the operation system and instructs the CPU to execute the application. In this way, the program according to the present invention is used as a single application program.

As described above, with an application executing device having an internal hard disk, the program according to the present invention can be used as a single application program. Thus, the program according to the present invention may be solely transferred, leased, or supplied over a network.
(Application Manager 2-Security Manager 4)

The above-described components, namely the application manager 2, the virtual machine 3, and the security manager 4 may be implemented as a single system LSI.

Generally, a system LSI is composed of a bare chip packaged on a high-density substrate. Alternatively, a system LSI may be composed of a plurality of bare chips that is packaged on a high-density substrate and has an external structure just as a single LSI (this type system LSI may be referred to also as a multi-chip module).

Focusing on the types of packaging, there are different types of system LSIs called QFP (quad flat package) and PGA (Pin Grid Array). QFP is a type of system LSI with pins extending from all four sides of the package. PGA is a type of system LSI package with an array of pins that are arranged on entire surface of the base of the package.

The pins act as an I/O interface with other circuits. Since the pins of the system LSI act as interface, by connecting other circuits to the pins, the system LSI plays a roll as the core of the application executing device.

A bare chip packaged into a system LSI is composed of a "front-end processor", "back-end processor", and "digital processor". The front-end processor digitizes analog signals. The back-end process produces analog output based on the digital data obtained by digital processing.

Each component illustrated in the figures showing the internal structure are implemented in the digital processor.

As mentioned in the description given in relation to the use "As Embedded Program", the instruction ROM stores a load module equivalent to the program of the present invention, a BIOS, and various pieces of middleware (operation systems). The part to which the above embodiments are particularly relevant is the load module equivalent to the program. Thus, by packaging, as a bare chip, the instruction ROM storing the load module equivalent to the program, a system LSI according to the present invention is produced.

Preferably, the system LSI is fabricated as SoC or SiP. In an SoC (SystemonChip) approach, multiple circuits are integrated on a single chip. In an SiP (System in Package) approach, multiple chips are joined into a single package with, for example, resin. Through the above processes, a system LSI according to the present invention can be produced based on the figures showing the internal structure of the application executing device referenced in the above embodiments.

Note that integrated circuits produced in the above manner may be referred to as IC, LSI, super LSI, or ultra LSI, depending on the packaging density.

In addition, all or some of the components of the application executing device of the present invention may be incorporated into a single chip. In addition, instead of the SoC and SiP approaches, the elements may be integrated using a dedicated circuit or a general-purpose processor. For example, it is applicable to use an FPGA (Field Programmable Gate Array) that can be programmed after an LSI is produced. It is also applicable to use a reconfigurable processor that allows reconstruction of connection between circuit cells within the LSI and their settings. When any new circuit integration technology becomes available or derived as the semiconductor technology advances, such new technology may be employed to integrate the functional blocks of the present invention. One possible candidate of such new technology may be achieved by adapting biotechnology.

INDUSTRIAL APPLICABILITY

The internal structure of an application executing device according to the present invention is disclosed above. Apparently, the application executing device can be manufactured in volume in accordance with the internal structures and is worth industrial use. In view of the above, the application executing device according to the present invention satisfies industrial applicability.

The invention claimed is:

1. An application executing method for causing a computer to read and execute an application program from a non-transitory recording medium inserted into the computer,
   the computer including:
   a drive unit operable to drive the inserted non-transitory recording medium to read information from the inserted non-transitory recording medium or operable to eject the inserted non-transitory recording medium; and
   a storage having a storage area specified with a directory for storing a file, and
   the non-transitory recording medium having recorded thereon:
      an application containing a target file to be checked for tampering;
      a first file containing a hash value of the target file;
      a signature file containing a hash value of the first file;
      a second file containing (i) a hash value of the signature file, (ii) a first leaf certificate indicating an organization ID, and (iii) a first root certificate related to the first leaf certificate; and
      a disc root certificate related to the first root certificate, wherein
      the disc root certificate being a root certificate assigned to the non-transitory recording medium,
   the application executing method comprising:
      a reading step of reading information from the inserted non-transitory recording medium driven by the drive unit;
      a first judgment step of comparing the hash value of the target file contained in the first file with a hash value calculated from the target file to judge whether or not the target file contained in the application has been tampered with;
      a second judgment step of comparing the hash value contained in the signature file with a hash value calculated from the first file to judge whether or not the first file has been tampered with;
      a third judgment step of comparing the hash value of the signature file contained in the second file with a hash value calculated from the signature file to judge whether or not the signature file has been tampered with;
      a fourth judgment step of comparing the first root certificate contained in the second file with the disc root certificate to judge if the two root certificates are identical;
      an execution step of executing the application; and
      an allocation step of allocating a storage area in the storage to the application to be executed, the storage area being a storage below a local storage directory corresponding to the hash value of the disc root certificate of the inserted non-transitory recording medium driven by the drive unit, wherein the execution step and the allocation step are performed by the computer, if the judgments in the first, second, third, and fourth judgment steps show that (i) the target file has not been tampered with, (ii) the first file has not been tampered with, (iii) the signature file has not been tampered with, and (iv) the first root certificate is identical to the disc root certificate.

2. An application executing device for reading and executing an application program from a non-transitory recording medium inserted into the application executing device, the non-transitory recording medium having recorded thereon:
- an application containing a target file to be checked for tampering;
- a first file containing a has value of the target file;
- a signature file containing a hash value of the first file;
- a second file containing (i) a hash value of the signature file, (ii) a first leaf certificate indicating an organization ID, and (iii) a first root certificate related to the first leaf certificate; and
- a disc root certificate related to the first root certificate, wherein the disc root certificate being a root certificate assigned to the non-transitory recording medium, the application executing device comprising:
- a drive unit operable to drive the inserted non-transitory recording medium to read information from the inserted non-transitory recording medium or operable to eject the inserted non-transitory recording medium;
- a storage having a storage area specified with a directory for storing a file;
- a first judgment unit operable to compare the hash value of the target file contained in the first file with a hash value calculated from the target file to judge whether or not the target file contained in the application has been tampered with;
- a second judgment unit operable to compare the hash value contained in the signature file with a hash value calculated from the first file to judge whether or not the first file has been tampered with;
- a third judgment unit operable to compare the hash value of the signature file contained in the second file with a hash value calculated from the signature file to judge whether or not the signature file has been tampered with;
- a fourth judgment unit operable to compare the first root certificate contained in the second file with the disc root certificate to judge if the two root certificates are identical;
- an execution unit operable to execute the application; and
- an allocation unit operable to allocate a storage area in the storage to the application to be executed, the storage area being a storage area below a local storage area corresponding to the hash value of the disc root certificate, wherein the execution unit and the allocation unit are configured to operate, if the first, second, and third judgment units judge that (i) the target file has not been tampered with, (ii) the first file has not been tampered with, (iii) the signature file has not been tampered with, and (iv) the first root certificate is identical to the disc root certificate.

3. The application executing method according to claim 1, wherein
the allocation step allocates the storage area below a directory corresponding to the organization ID, wherein the directory corresponding to the organization ID is a directory below the local storage directory.

4. The application executing method according to claim 2, wherein
the allocation step allocates the storage area below a directory corresponding to the organization ID, wherein the directory corresponding to the organization ID is a directory below the local storage directory.

* * * * *

UNITED STATES PATENT AND TRADEMARK OFFICE
CERTIFICATE OF CORRECTION

PATENT NO.         : 8,122,263 B2                             Page 1 of 1
APPLICATION NO.    : 11/573477
DATED              : February 21, 2012
INVENTOR(S)        : Germano Leichsenring et al.

It is certified that error appears in the above-identified patent and that said Letters Patent is hereby corrected as shown below:

On Title page, Abstract (57), (column 2, Abstract line 3) of the printed patent, please change "manger" to --manager-- after application.

On Title page, Abstract (57), (column 2, Abstract line 8) of the printed patent, please change "manger" to --manager-- after security.

At column 27, line 16 (claim 2, line 8) of the printed patent, please change "has" to --hash-- before value.

Signed and Sealed this
Sixth Day of November, 2012

David J. Kappos
*Director of the United States Patent and Trademark Office*